(12) United States Patent
Kiyota

(10) Patent No.: US 11,621,797 B2
(45) Date of Patent: Apr. 4, 2023

(54) INFORMATION TERMINAL AND INFORMATION PROCESSING DEVICE

(71) Applicant: SONY CORPORATION, Tokyo (JP)

(72) Inventor: Koji Kiyota, Tokyo (JP)

(73) Assignee: SONY CORPORATION, Tokyo (JP)

( * ) Notice: Subject to any disclaimer, the term of this patent is extended or adjusted under 35 U.S.C. 154(b) by 43 days.

(21) Appl. No.: 17/286,678

(22) PCT Filed: Oct. 16, 2019

(86) PCT No.: PCT/JP2019/040571
§ 371 (c)(1),
(2) Date: Apr. 19, 2021

(87) PCT Pub. No.: WO2020/090455
PCT Pub. Date: May 7, 2020

(65) Prior Publication Data
US 2021/0376952 A1    Dec. 2, 2021

(30) Foreign Application Priority Data
Oct. 29, 2018    (JP) .............................. JP2018-202512

(51) Int. Cl.
*H04L 1/00*     (2006.01)
*G16Y 40/10*     (2020.01)
(Continued)

(52) U.S. Cl.
CPC ............ *H04L 1/0045* (2013.01); *G08B 21/24* (2013.01); *G16Y 20/20* (2020.01); *G16Y 40/10* (2020.01);
(Continued)

(58) Field of Classification Search
CPC ........ G08B 21/24; G08B 29/04; H04L 1/0045; G16Y 20/20; G16Y 40/10; G16Y 40/20;
(Continued)

(56) References Cited

U.S. PATENT DOCUMENTS

| | | | | |
|---|---|---|---|---|
| 4,744,004 A | * | 5/1988 | Hammond | ........... G01R 22/065 |
| | | | | 324/156 |
| 6,212,923 B1 | * | 4/2001 | Clark | .................. E05B 47/0012 |
| | | | | 70/333 R |

(Continued)

FOREIGN PATENT DOCUMENTS

| EP | 1309460 B1 | 8/2010 |
|---|---|---|
| JP | 2004-526217 A | 8/2004 |

(Continued)

OTHER PUBLICATIONS

International Search Report and Written Opinion of PCT Application No. PCT/JP2019/040571, dated Dec. 10, 2019, 07 pages of ISRWO.

*Primary Examiner* — Brian Wilson
(74) *Attorney, Agent, or Firm* — Chip Law Group

(57) ABSTRACT

The present technology relates to an information terminal, an information processing device, and a program that make it possible to find out that an installation status has changed. The information terminal transmits information at predetermined time intervals. The information terminal causes information that is to be transmitted in a normal state of installation to be transmitted in a case where, after a return from a sleep state, a flag indicating whether or not an abnormal state of the installation has been detected indicates that the abnormal state has not been detected, and causes information different from the information that is to be transmitted in the normal state to be transmitted in a case where, after the return from the sleep state, the flag indicates that the abnormal state has been detected. The present technology can be applied to a home communication system.

8 Claims, 15 Drawing Sheets

(51) Int. Cl.
  *G16Y 40/30* (2020.01)
  *G16Y 20/20* (2020.01)
  *G16Y 40/20* (2020.01)
  *G08B 21/24* (2006.01)
  *H04Q 9/00* (2006.01)

(52) U.S. Cl.
  CPC .............. *G16Y 40/20* (2020.01); *G16Y 40/30* (2020.01); *H04Q 9/00* (2013.01)

(58) Field of Classification Search
  CPC .... G16Y 40/30; H04Q 9/00; H04Q 2209/826; H04Q 2209/883
  See application file for complete search history.

(56) References Cited

U.S. PATENT DOCUMENTS

| | | | |
|---|---|---|---|
| 2002/0075145 A1 | 6/2002 | Hardman et al. | |
| 2014/0125316 A1* | 5/2014 | Ramirez | G01R 11/24 324/110 |
| 2015/0226583 A1* | 8/2015 | Aiken | G01R 11/25 356/399 |

FOREIGN PATENT DOCUMENTS

| | | | |
|---|---|---|---|
| JP | 2016-176738 A | 10/2016 | |
| JP | 2016-212739 A | 12/2016 | |
| WO | 2002/007993 A2 | 1/2002 | |
| WO | 2016/147800 A1 | 9/2016 | |

* cited by examiner

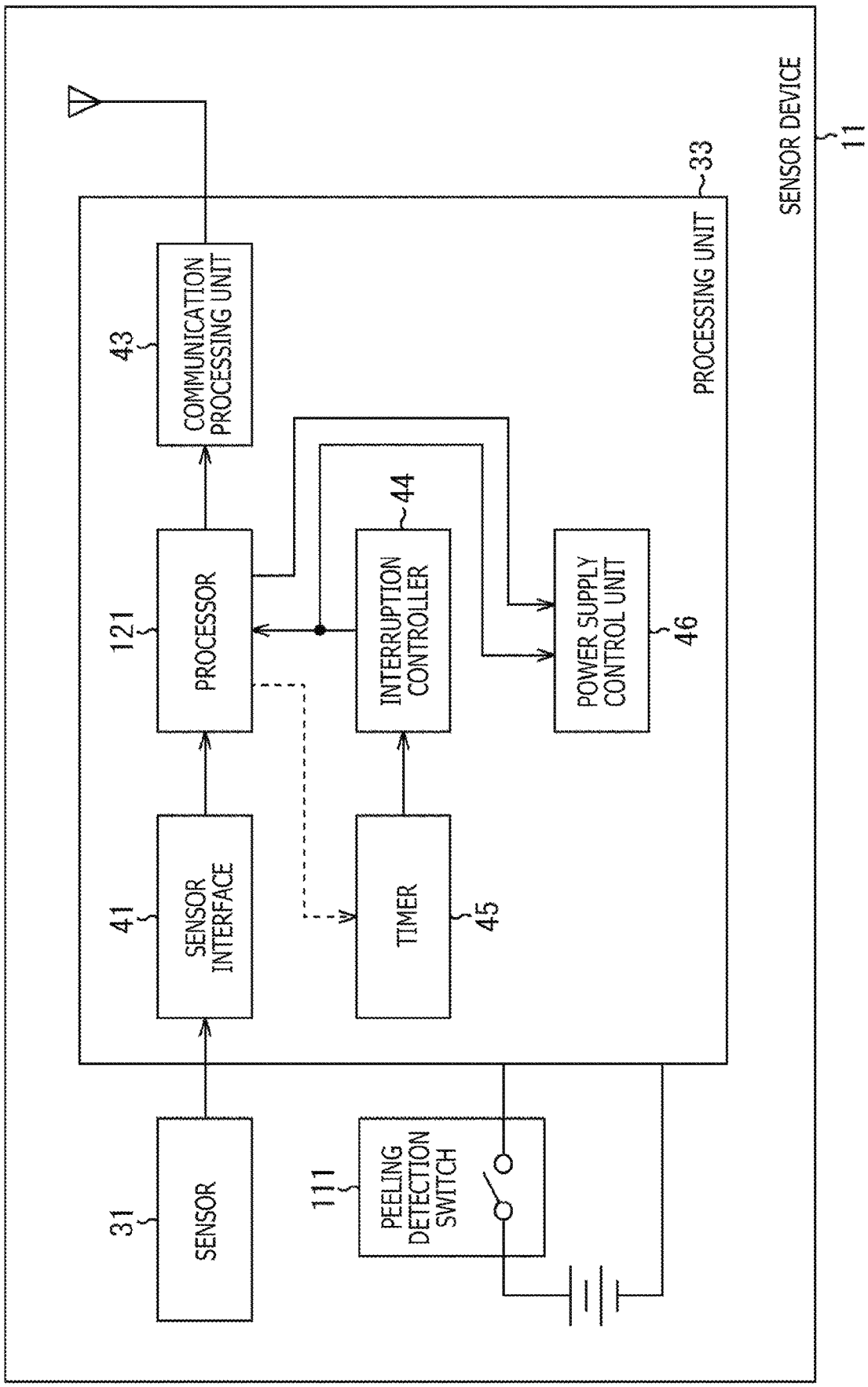

F I G. 14

| SENSOR | FEATURE |
|---|---|
| IMAGE CAPTURE SENSOR | THIS TYPE OF SENSOR IS SENSOR HAVING DIRECTIVENESS, AND ITS INSTALLATION POSITION AND ORIENTATION ARE DIRECTLY LINKED TO ITS OBSERVATION RANGE. NOT IN SYSTEM IN WHICH PERSONS DIRECTLY VIEW CAPTURED IMAGE, BUT IN SYSTEM THAT DETECTS SPECIFIC OBJECT THROUGH EXECUTION OF IMAGE RECOGNITION PROCESSING AND ANY OTHER PROCESSING ON CAPTURED IMAGE, KNOWING CHANGES OF INSTALLATION POSITION AND ORIENTATION FROM RECOGNITION RESULT IS DIFFICULT. |
| HUMAN DETECTION SENSOR (INFRARED TYPE) | THIS TYPE OF SENSOR IS SENSOR HAVING DIRECTIVENESS, THOUGH NOT AS MUCH AS IMAGE CAPTURE SENSOR, AND ITS INSTALLATION POSITION AND ORIENTATION INFLUENCE ITS OBSERVATION RANGE. KNOWING THIS INFLUENCE ON OBSERVATION RANGE FROM MEASUREMENT RESULT IS DIFFICULT (BECAUSE OBSERVATION RANGE CANNOT BE VISUALIZED.) |
| SUNSHINE SENSOR | THIS TYPE OF SENSOR IS INFLUENCED BY WHETHER SENSOR IS FACING SUNSHINE DIRECTION. SENSOR IS ALSO INFLUENCED WHEN ITS POSITION MOVES AND ENTERS SHADED AREA. |
| TEMPERATURE SENSOR, HUMIDITY SENSOR | THIS TYPE OF SENSOR HAS ALMOST NO DIRECTIVENESS, AND MEASUREMENT RESULT IS INFLUENCED IN CASE WHERE ITS INSTALLATION POSITION CHANGES AND IS EXPOSED TO DIRECT SUNLIGHT, OR IN ANY OTHER SIMILAR CASE. |
| RAINFALL SENSOR | IN CASE OF SENSOR OF TYPE THAT DETECTS RAINFALL BY USING ELECTRIC CONDUCTION OF RAINDROPS, ITS SENSOR SURFACE IS REQUIRED TO FACE UPWARD ALTHOUGH THIS REQUIREMENT DEPENDS ON ITS SENSING METHOD. |
| VIBRATION SENSOR | IN CASE OF SENSOR FOR DETECTING VIBRATION OF INSTALLATION TARGET, SENSOR IS INCAPABLE OF DETECTING IT WHEN HAVING DISENGAGED FROM INSTALLATION TARGET. SENSOR IS INFLUENCED EVEN WHEN IT IS ABOUT TO PEEL. IN CASE WHERE MEASUREMENT TARGET RARELY VIBRATES, DETERMINING DROPPING OFF OF SENSOR FOR REASON OF NO DETECTION OF VIBRATION IS DIFFICULT. |
| ACCELERATION SENSOR | (FOR EXAMPLE, SENSOR ATTACHED TO DOOR TO DETECT OPENING/CLOSING OF DOOR BY USING ACCELERATION AT TIME OF OPENING/CLOSING) IN CASE OF SENSOR FOR DETECTING AN ACCELERATION OF INSTALLATION TARGET, JUST LIKE VIBRATION SENSOR, SENSOR IS INCAPABLE OF DETECTING IT WHEN HAVING DISENGAGED FROM INSTALLATION TARGET. |
| GAS SENSOR, SMOKE SENSOR | INSTALLATION POSITION OF SENSOR OF THIS TYPE IS DETERMINED ACCORDING TO PROPERTY (HEAVIER OR LIGHTER THAN AIR) OF MEASUREMENT-TARGET GAS. FOR EXAMPLE, SENSOR FOR DETECTING GAS LIGHTER THAN AIR IS REQUIRED TO BE INSTALLED NEAR CEILING. |

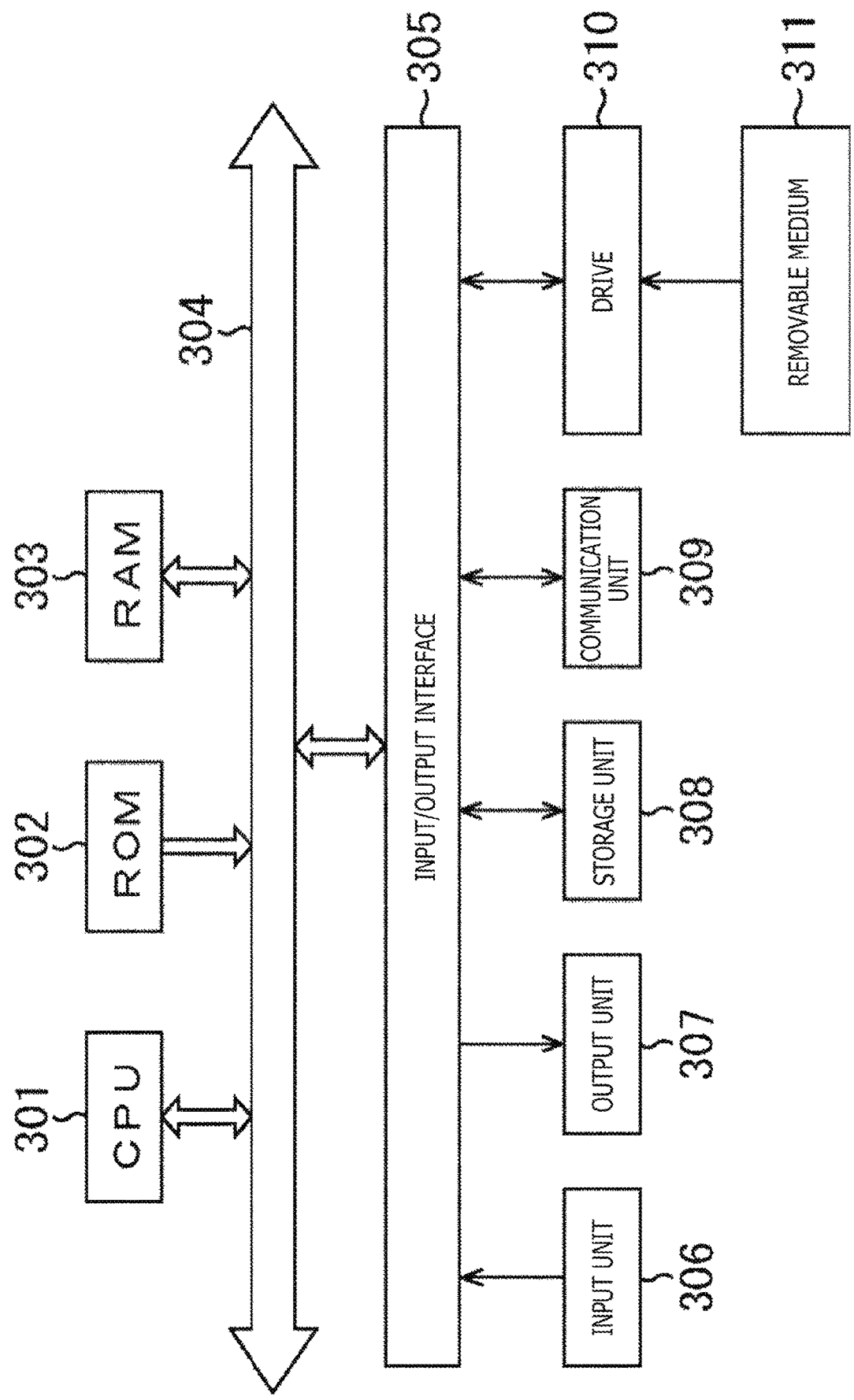

INFORMATION TERMINAL AND INFORMATION PROCESSING DEVICE

CROSS REFERENCE TO RELATED APPLICATIONS

This application is a U.S. National Phase of International Patent Application No. PCT/JP2019/040571 filed on Oct. 16, 2019, which claims priority benefit of Japanese Patent Application No. JP 2018-202512 filed in the Japan Patent Office on Oct. 29, 2018. Each of the above-referenced applications is hereby incorporated herein by reference in its entirety.

TECHNICAL FIELD

The present technology relates to an information terminal, an information processing device, and a program, and in particular to an information terminal, an information processing device, and a program that are configured to make it possible to find out that an installation status has changed.

BACKGROUND ART

Battery-driven, compact and lightweight IoT (Internet of Things) devices are being put into practice these days with the advancement of the performance of a microprocessor, the advancement of low electric power technology, and the advancement of communication technology.

For an installation method for such an IoT device, in view of the freedom degrees of an installer and an installation position, an adhesion-type installation method using double-sided adhesive tape or an adhesive agent is preferable for the following reasons (see PTL 1.)

Such installation needs no wiring work, and thus, a user is able to make the installation without depending on a professional installer.

The installation by means of fastening with screws is sometimes difficult for the reasons of the raw material of a fixing surface, the property of the fixing surface, and the like. For the raw material of the fixing surface, in the case where, for example, metal or glass is used as the raw material, the reason lies in the difficulty of making a hole. For the property of the fixing surface, the reason lies in the difficulty of making a hole because of the necessity of maintaining a waterproof property such as those of a bathroom and an exterior wall. Note, however, that achieving lightweight makes the fastening with screws not essential.

Further, in order to reduce the maintenance cost, such an IoT device is expected to perform maintenance-free operation for a long time, for example, until the end of a battery lifetime of approximately ten years.

For the adhesion-type installation method, however, the change of an installation status, such as peeling, may occur because of deterioration of the adhesive agent due to long-time installation, an impact due to hitting to a different object or the like, user's inappropriate installation, or the like.

CITATION LIST

Patent Literature

[PTL 1]
Japanese Patent Laid-open No. 2016-212739

SUMMARY

Technical Problem

Such an IoT device is highly likely to be installed at a remote place or the like where the installer is unable to make visual checks thereof on a daily basis. Thus, even though the change of the installation status of the IoT device has occurred, the installer may not notice the change.

The present technology has been made in view of such situations, and makes it possible to find out that the installation status has changed.

Solution to Problem

A terminal according to a first aspect of the present technology includes a transmitting unit that transmits information at predetermined time intervals, and a control unit that causes information that is to be transmitted in a normal state of installation to be transmitted in a case where, after a return of the control unit from a sleep state, a flag indicating whether or not an abnormal state of the installation has been detected indicates that the abnormal state has not been detected, and that causes information different from the information that is to be transmitted in the normal state to be transmitted in a case where, after the return of the control unit from the sleep state, the flag indicates that the abnormal state has been detected.

In one aspect of the present technology, information is transmitted at predetermined time intervals. Further, in a case where, after a return from a sleep state, a flag indicating whether or not an abnormal state of installation has been detected indicates that the abnormal state has not been detected, information that is to be transmitted in a normal state of the installation is transmitted, and in a case where, after the return from the sleep state, the flag indicates that the abnormal state has been detected, information different from the information that is to be transmitted in the normal state is transmitted.

An information processing device according to a second aspect of the present technology includes a receiving unit that receives information transmitted from a terminal including a transmitting unit that transmits the information at predetermined time intervals, and a control unit that causes information that is to be transmitted in a normal state of installation of the terminal to be transmitted in a case where, after a return of the control unit from a sleep state, a flag indicating whether or not an abnormal state of the installation has been detected indicates that the abnormal state has not been detected, and that causes information different from the information that is to be transmitted in the normal state to be transmitted in a case where, after the return of the control unit from the sleep state, the flag indicates that the abnormal state has been detected, the information received by the receiving unit being either the information that is to be transmitted in the normal state or the information different from the information that is to be transmitted in the normal state. Further, the information processing device includes a notification control unit that causes at least the information different from the information that is to be transmitted in the normal state to be notified to a user.

In another aspect of the present technology, information transmitted from a terminal is received, the terminal including a transmitting unit that transmits the information at predetermined time intervals, and a control unit that causes information that is to be transmitted in a normal state of installation of the terminal to be transmitted in a case where, after a return of the control unit from a sleep state, a flag indicating whether or not an abnormal state of the installation has been detected indicates that the abnormal state has not been detected, and that causes information different from the information that is to be transmitted in the normal state to be transmitted in a case where, after the return of the control unit from the sleep state, the flag indicates that the abnormal state has been detected, the information received by the receiving unit being either the information that is to be transmitted in the normal state or the information different from the information that is to be transmitted in the normal state. Further, at least the information different from the information that is to be transmitted in the normal state is notified to a user.

BRIEF DESCRIPTION OF DRAWINGS

FIG. 10 is a block diagram illustrating another configuration example of the sensor device.

FIG. 14 is a diagram listing examples of a sensor applied to the present technology and its feature.

FIG. 15 is a block diagram illustrating a hardware configuration example of a computer.

DESCRIPTION OF EMBODIMENTS

Hereinafter, embodiments for practicing the present technology will be described. The description will be made in the following order.

1. First embodiment (peeling detection mechanism)
2. Second embodiment (peeling detection switch concurrently serving as switch for power supply)
3. Others

First Embodiment

Configuration Example of Home Communication System

Figure 1:
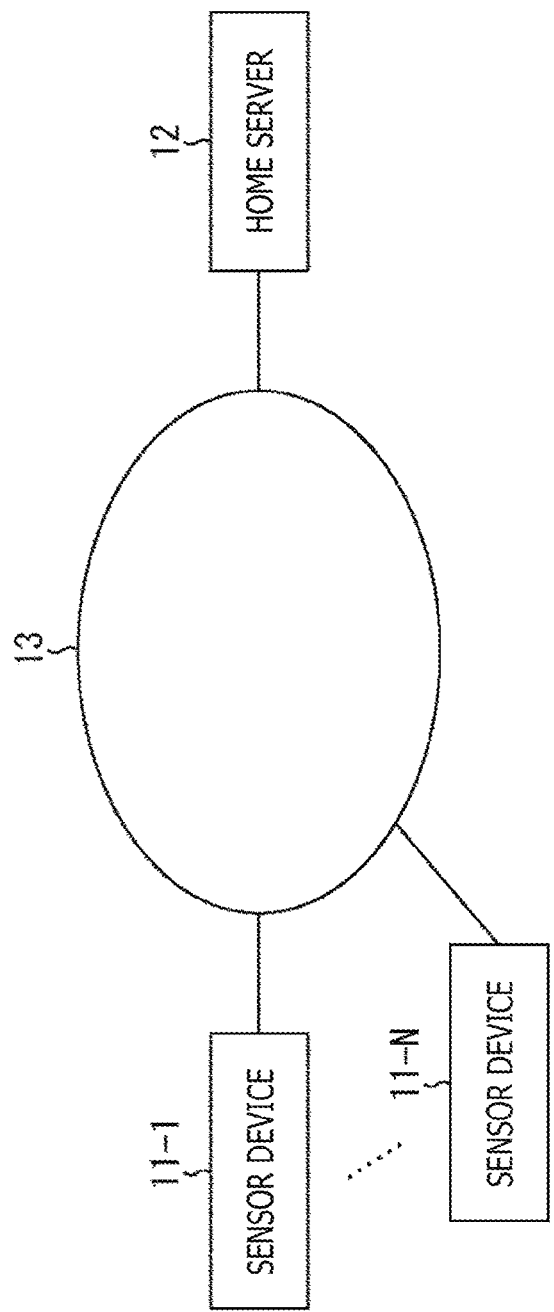
FIG. 1 is a diagram illustrating an example of a home communication system according to the present technology.

FIG. 1 is a block diagram illustrating a configuration example of a home communication system according to an embodiment of the present technology.

The home communication system of FIG. 1 is configured in the form in which sensor devices 11-1 to 11-N, and a home server 12 are connected via a network 13 such as a wireless LAN or the Internet. The home communication system is a system installed in home or the like.

The sensor devices 11-1 to 11-N are terminals each serving as an IoT (Internet of Things) device including one or a plurality of sensors. The sensor devices 11-1 to 11-N include various kinds of sensors, such as a camera, a microphone, an acceleration sensor, an angular velocity sensor, a geomagnetic sensor, an illuminance sensor, a temperature sensor, a humidity sensor, a barometric pressure sensor, and a positioning sensor.

Hereinafter, the sensor devices 11-1 to 11-N will be collectively referred to as a sensor device 11 as appropriate, in cases where there is no need for individually distinguishing them.

The sensor device 11 makes a measurement and transmits sensor data representing a measurement result to the home server 12, at predetermined time intervals.

<Normal and Abnormal States of Installation of Sensor Device>

Figure 2A:
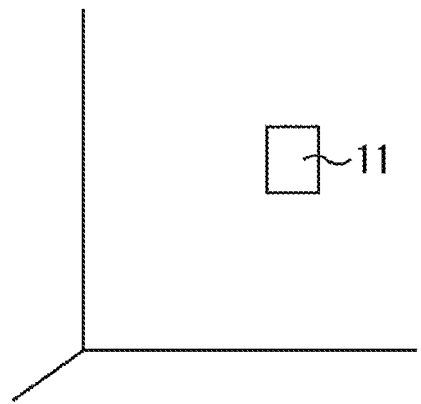
FIGS. 2A and 2B depict diagrams illustrating an example of normal and abnormal states of the installation of a sensor device.
Figure 2B:
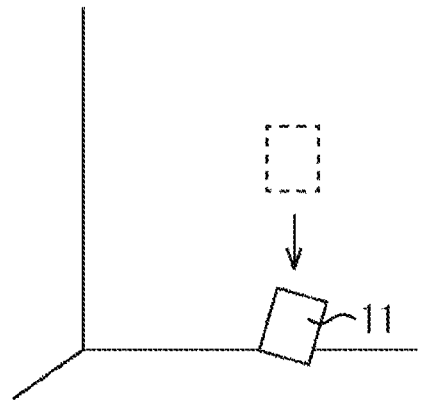

FIGS. 2A and 2B are diagrams illustrating an example of normal and abnormal states of the installation of the sensor device 11.

In the normal state of the installation, as illustrated in FIG. 2A, the sensor device 11 is installed in a way that causes an adherend surface of its housing to adhere to a fixing surface of an in-room wall or the like by using an adhesive member such as double-sided adhesive tape. In such a normal state of the installation, the sensor device 11 transmits the sensor data described above.

In the abnormal state of the installation, as illustrated in of FIG. 2B, the sensor device 11 is in a situation in which its housing has peeled from the fixing surface and its installation state has changed. That is, in the case where the sensor device 11 has detected the peeling of its housing from the fixing surface, the sensor device 11 transmits installation abnormality notification data, which is data for notifying of the abnormality of the installation, to the home server 12 as information different from the sensor data. In such an abnormal state of the installation, the sensor device 11 transmits the installation abnormality notification data.

The home server 12 receives the sensor data or the installation abnormality notification data, which is transmitted from the sensor device 11. The home server 12 makes an analysis using the sensor data to display the result of the analysis, as needed. The home server 12 notifies a user of the abnormality of the installation of the sensor device 11 on the basis of the installation abnormality notification data. The abnormality of the installation is notified to the user by means of blinking of an LED, or the like.

Configuration Example of Sensor Device

Figure 3:
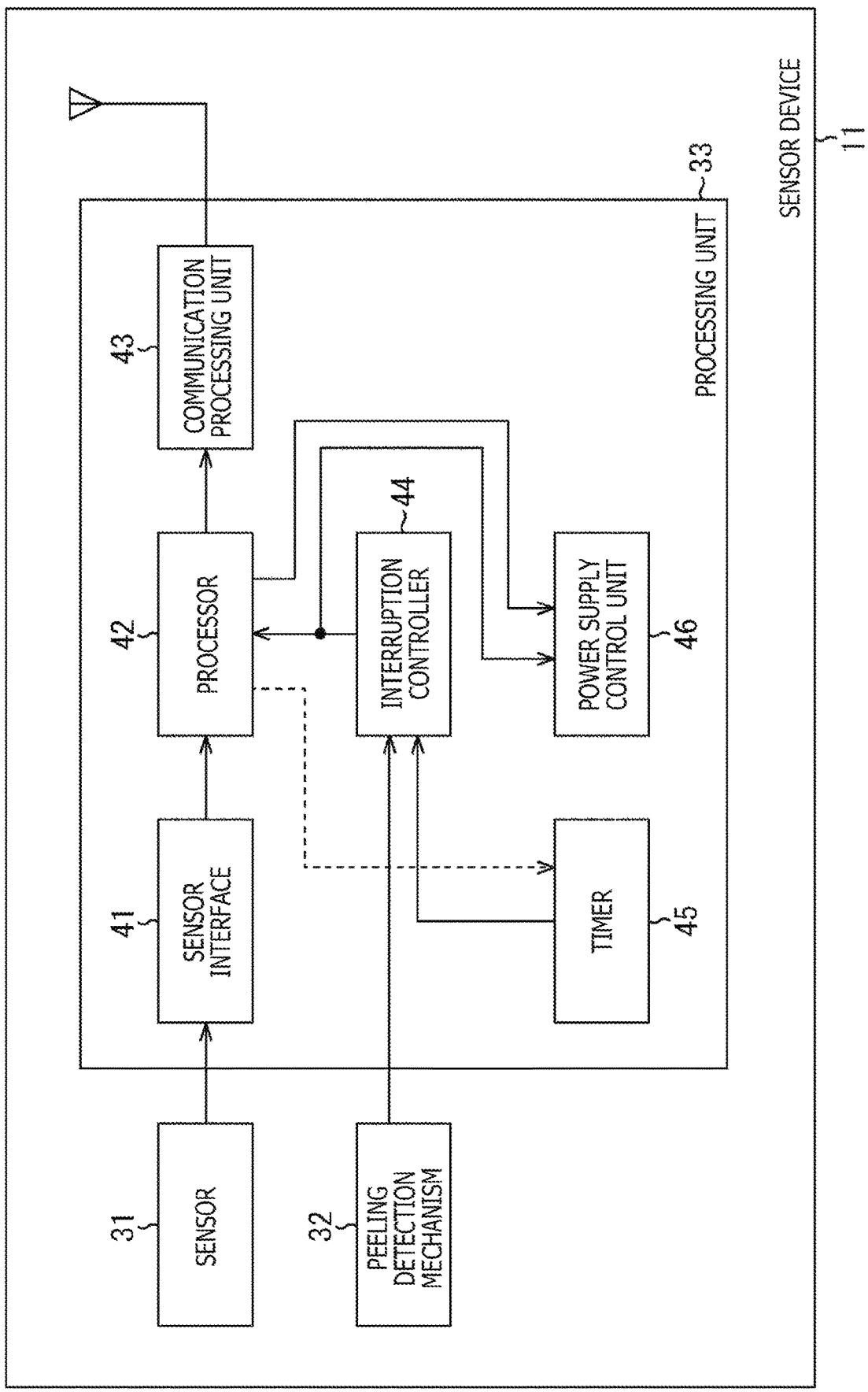
FIG. 3 is a block diagram illustrating a configuration example of the sensor device.

FIG. 3 is a block diagram illustrating a configuration example of the sensor device 11.

The sensor device 11 includes a sensor 31, a peeling detection mechanism 32, and a processing unit 33.

The sensor 31 makes a measurement according to an instruction from the processing unit 33, and outputs sensor data to the processing unit 33.

In the case where the peeling detection mechanism 32 has detected that the housing has peeled from the fixing surface, the peeling detection mechanism 32 outputs a peeling detection signal to the processing unit 33. The peeling detection signal indicates that it has been detected that the housing has peeled from the fixing surface.

The processing unit 33 includes a sensor interface 41, a processor 42, a communication processing unit 43, an interruption controller 44, a timer 45, and a power supply control unit 46.

The sensor interface 41 outputs the sensor data supplied from the sensor 31 to the processor 42.

The processor 42 performs various kinds of arithmetic processing and operation control of individual portions by executing a given program, and operates as a key processing device in the sensor device 11.

For example, the processor 42 performs initialization processing. The initialization processing is processing for setting the cycle of an interruption on the timer 45 so as to cause the timer 45 to periodically cause the interruption.

Subsequent to the initialization processing, the processor 42 clears an abnormality detection flag managed by the processor 42 itself. The abnormality detection flag is a flag indicating that the abnormality state has been detected. In the case where the abnormality detection flag is set, this situation indicates that the abnormality state has been detected.

Subsequent to clearing the abnormality detection flag, the processor 42 outputs a sleep signal to the power supply control unit 46 to bring the state of the processor 42 itself into a sleep state. The sleep state is a low consumed-power state. For states of the processor, there are the sleep state and a normal state. The normal state is a normal consumed-power state in which electric power is consumed by operation for the various kinds of arithmetic processing, operation for the operation control of individual portions, and the like.

The processor 42 returns from its sleep state in response to an event in which, in its sleep state, an interruption signal is supplied from the interruption controller 44. Subsequent to returning from the sleep state, the processor 42 confirms the cause of the return.

In the case where the cause of the return is an interruption having been caused by the timer 45, the processor 42 confirms the abnormality detection flag.

In the case where the abnormality detection flag is not set, that is, in the case where the abnormality detection flag indicates that the abnormality state has not been detected, the processor 42 performs normal communication processing for transmitting sensor data.

Specifically, the processor 42 controls the sensor interface 41 to cause the sensor interface 41 to make a measurement of a measurement target by the sensor 31. The processor 42 converts sensor data supplied from the sensor interface 41 in such a way that the volume of the sensor data becomes smaller. The processor 42 outputs the converted sensor data to the communication processing unit 43 to cause the communication processing unit 43 to transmit the converted sensor data to the home server 12.

In the case where the abnormality detection flag is set, that is, in the case where the abnormality detection flag indicates that the abnormality state has been detected, the processor 42 performs abnormality notification communication processing for transmitting the installation abnormality notification data. The processor 42 outputs, instead of the converted sensor data, the installation abnormality notification data to the communication processing unit 43 to cause the communication processing unit 43 to transmit the installation abnormality notification data to the home server 12.

After the completion of the transmission by the communication processing unit 43, the processor 42 outputs the sleep signal again to the power supply control unit 46 to enter the sleep state.

On the other hand, in the case where the cause of the return is an interruption having been caused by the peeling detection signal, the processor 42 sets the abnormality detection flag. As described later, in the case where the peeling detection signal has been output from the peeling detection mechanism 32, the interruption signal is supplied from the interruption controller 44. Subsequent to setting the abnormality detection signal, the processor 42 outputs the sleep signal to the power supply control unit 46 to bring the state of the processor 42 itself into the sleep state.

The communication processing unit 43 transmits the sensor data or the installation abnormality notification data, which is supplied from the processor 42, to the home server 12. Here, the communication processing unit 43 may be configured to have only the transmission function of transmitting the information to the home server 12, or the communication processing unit 43 may be configured to further have a reception function of receiving information transmitted from the home server 12.

The interruption controller 44 outputs the interruption signal to the processor 42 and the power supply control unit 46 in response to the event in which the timer 45 causes the interruption or in response to the event in which the peeling detection signal is supplied from the peeling detection mechanism 32.

The timer 45 causes the interruption to the interruption controller 44 at intervals of the cycle having been set by the processor 42.

Subsequent to the turn on of a power supply, the power supply control unit 46 supplies supplied power to the processor 42. For example, in response to the event in which the power supply control unit 46 is supplied with the interruption signal from the interruption controller 44, the power supply control unit 46 supplies the processor 42 with power enough for the processor 42 to be capable of operating in the normal state. Further, in response to the event in which the power supply control unit 46 is supplied with the sleep signal from the processor 42, the power supply control unit 46 supplies the processor 42 with minimum power for the processor 42 to maintain the sleep state.

In addition, the sensor device 11 having the configuration of FIG. 3 may be configured to be equipped with a mechanism for clearing the abnormal detection flag by means of a method other than a re-turn on of the power supply. The sensor device 11 may be configured to be equipped with a mechanism for waiting for the completion of the installation after the turn on of the power supply. Further, although, in FIG. 3, the power supply control unit 46 performs only the control of the power, the power control unit 46 may be configured to additionally perform control of a clock.

Figure 4A:
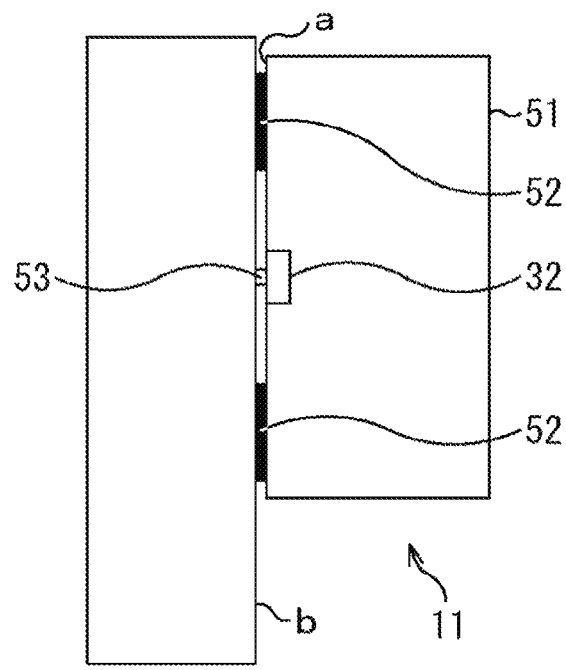
FIGS. 4A and 4B depict diagrams illustrating an installation example of the sensor device.
Figure 4B:
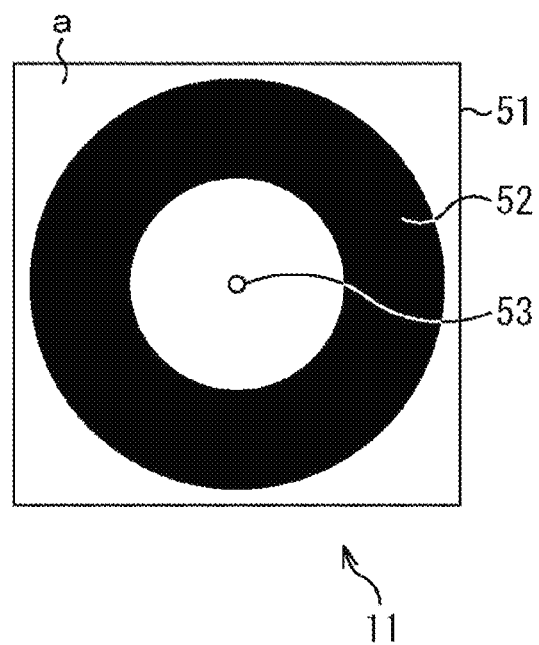

FIGS. 4A and 4B is a are diagrams illustrating an installation example of the sensor device 11.

FIG. 4A illustrates an example in which the sensor device 11 is installed in a way that causes an adherend surface a of a housing 51 to adhere to a fixing surface b of a wall or the like As illustrated in FIG. 4A, at the center portion of the adherend surface a of the housing 51, a switch 53 including the peeling detection mechanism 32 is disposed so as to protrude. The switch 53 is a push switch structured to be in an on-state when being in contact with the fixing surface b, and be brought to an off-state when having separated from the fixing surface b. The switch 53 is in the on-state in a case of being in the state illustrated in FIG. 4A.

FIG. 4B illustrates an exterior appearance of the adherend surface a.

As illustrated in FIG. 4B, an adhesive member 52 is disposed in an annular shape on the adherend surface a of the housing 51. When the sensor device 11 is in an installed state, the configuration in which the adhesive member 52 is disposed so as to enclose the switch 53 and the adhesive member 52 is in close contact with the fixing surface b prevents the switch 53 from being exposed to the outside.

The switch 53, therefore, is not influenced by external environments such as dust and water, and thus, the peeling detection can be stably made for a long period.

Note that the switch 53 is not limited to the push switch, and may be implemented by a reed switch, a mercury switch, or the like. The switch 53 is sufficient just to be capable of detecting that the switch 53 has separated from the fixing surface. The state of the switch 53 at the time of the separation may be any of the on-state and the off-state, provided that the switch 53 is capable of detecting that the switch 53 has separated from the fixing surface.

Configuration Example of Home Server

Figure 5:
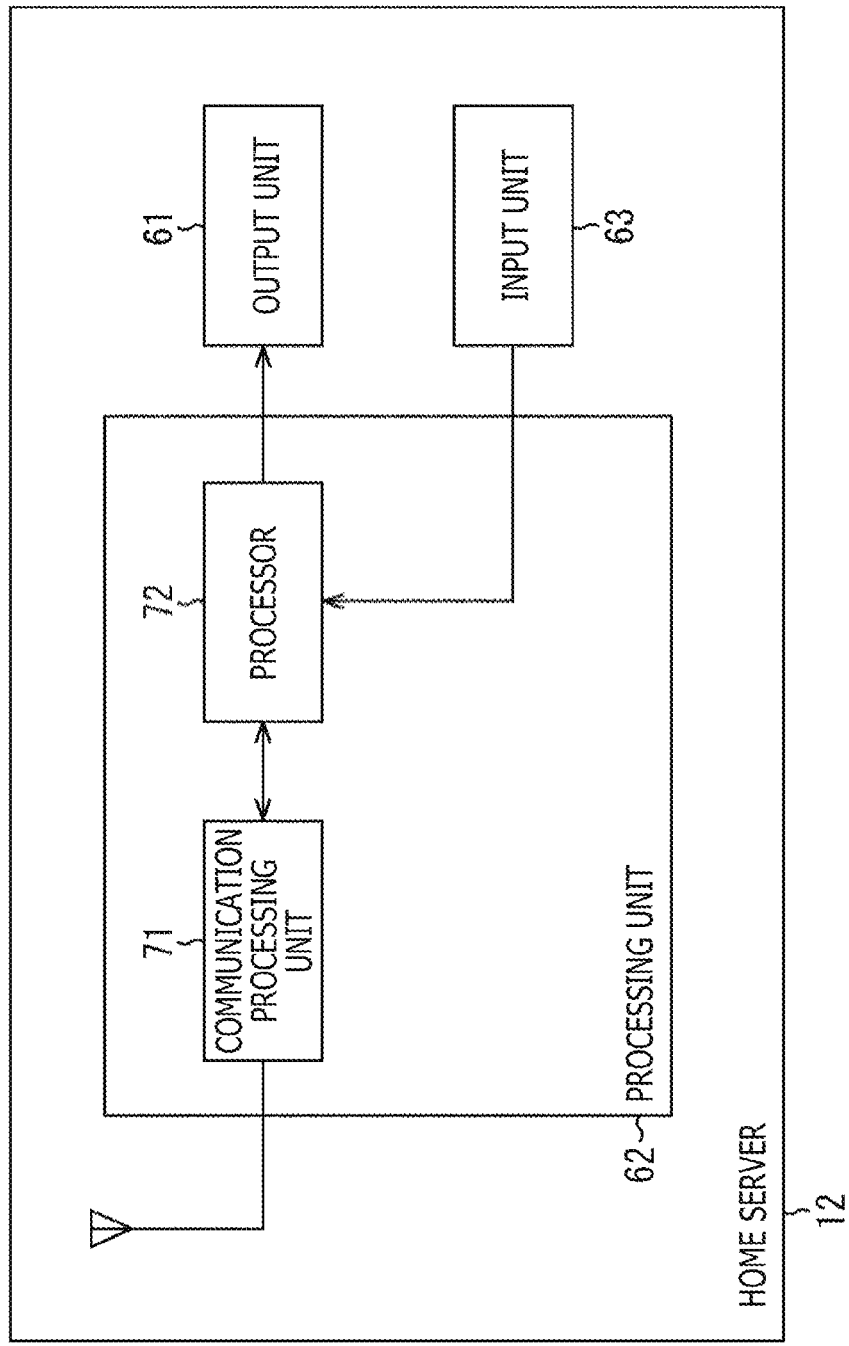
FIG. 5 is a block diagram illustrating a configuration example of a home server.

FIG. 5 is a block diagram illustrating a configuration example of a home server.

The home server 12 includes an output unit 61, a processing unit 62, and an input unit 63.

The output unit 61 includes an LED, a speaker, a buzzer, a display, a vibrator, and other components. The output unit 61 makes a notification to a user, or the like according to an instruction from the processing unit 62.

The processing unit 62 includes a communication processing unit 71 and a processor 72.

The communication processing unit 71 receives the sensor data or the installation abnormality notification data, having been transmitted from the sensor device 11, and supplies the received sensor data or installation abnormality notification data to the processor 72. Here, the communication processing unit 71 is also capable of transmitting data supplied from the processor 72, such as data for notifying any other terminal of the abnormality of the installation.

The processor 72 performs various kinds of arithmetic processing and operation control of individual portions by executing a given program, and operates as a key processing device in the home server 12.

For example, the processor 72 analyzes a measurement target on the basis of the sensor data, and causes the output unit 61 to notify of the result of the analysis, the abnormality of the measurement target, and the like.

The processor 72 determines whether or not the data supplied from the communication processing unit 71 is the sensor data. In the case where the processor 72 has determined that the data supplied from the communication processing unit 71 is not the sensor data, the processor 72 controls the output unit 61 to cause the output unit 61 to make a notification of the abnormality of the installation. The notification of the abnormality of the installation is made in an expression different from that of the notification of the result of the analysis of the sensor data, that of the notification of the abnormality of a monitoring target, and that of any other kind of notification.

Further, in the case where the sensor data or non-sensor data has not been received within a constant communication cycle, the processor 72 determines that an abnormality of some kind has occurred in the sensor device 11, and similarly causes the output unit 61 to make the notification of the abnormality of the installation.

In the notification of the abnormality of the installation, for example, the processor 72 causes the output unit 61 to turn on its LED's light emission, output an alarm sound, and/or display the occurrence of the abnormality of the installation on its display. Here, in the case of the notification of the abnormality of the measurement target, although, similarly, the LED light emission or the like may be made, an expression different from that of the notification of the abnormality of the installation is used to enable a user to distinguish the notification of the abnormality of the measurement target.

The method for the notification of the abnormality of the installation may be changed for each of the sensor devices 11 that transmit the installation abnormality notification data. For example, the configuration may be made such that the method for the notification of the abnormality of the installation of the sensor device 11-1 is performed by means of only a light emission, and the method for the notification of the abnormality of the installation of the sensor device 11-2 is performed by means of the light emission and a sound output. The blink pattern of the light emission and the tone of the sound output may be changed for each of the sensor devices 11. In the case where the display is used, the configuration may be made such that the display displays content from which a sensor device 11 having notified of the abnormality of its installation can be identified.

The input unit 63 includes switches, a touch sensor, a mouse device, a keyboard, and other components.

The input unit 63 receives, for each of the sensor devices 11, an input regarding the setting of the method for the notification of the abnormality of the installation, on the basis of an operation by a user. The input unit 63 receives an input of a response from the user with respect to the notification of the abnormality of the installation.

In addition, the configuration may be made such that notifications having non-urgent content, such as a notification of the result of the analysis, are made by being triggered by an input to the input unit 63.

The above constituent elements are not needed to be housed in the same housing. For example, the output unit 61 may be implemented by an output unit of a mobile phone, such as a smartphone, which is connected via the internet or Wi-Fi. Similarly, the input unit 63 may be implemented by an input unit of the mobile phone.

Further, the output unit 61 and the input unit 63 each may be configured by a plurality of units. For example, a plurality of the output units 61 may be used by a plurality of users, or may be used by one user. A plurality of the input units 63 may be used by a plurality of users, or may be used by one user. In this case, the configuration is to be made such that, for each of the sensor devices 11, an output unit 61 and an input unit 63 can be selected. Further, the configuration may be made such that the notifications of the result of the analysis, the abnormality of the measurement target, and the abnormality of the installation are each output from a corresponding one of different output units 61.

<Operation of Sensor Device>

Figure 6:
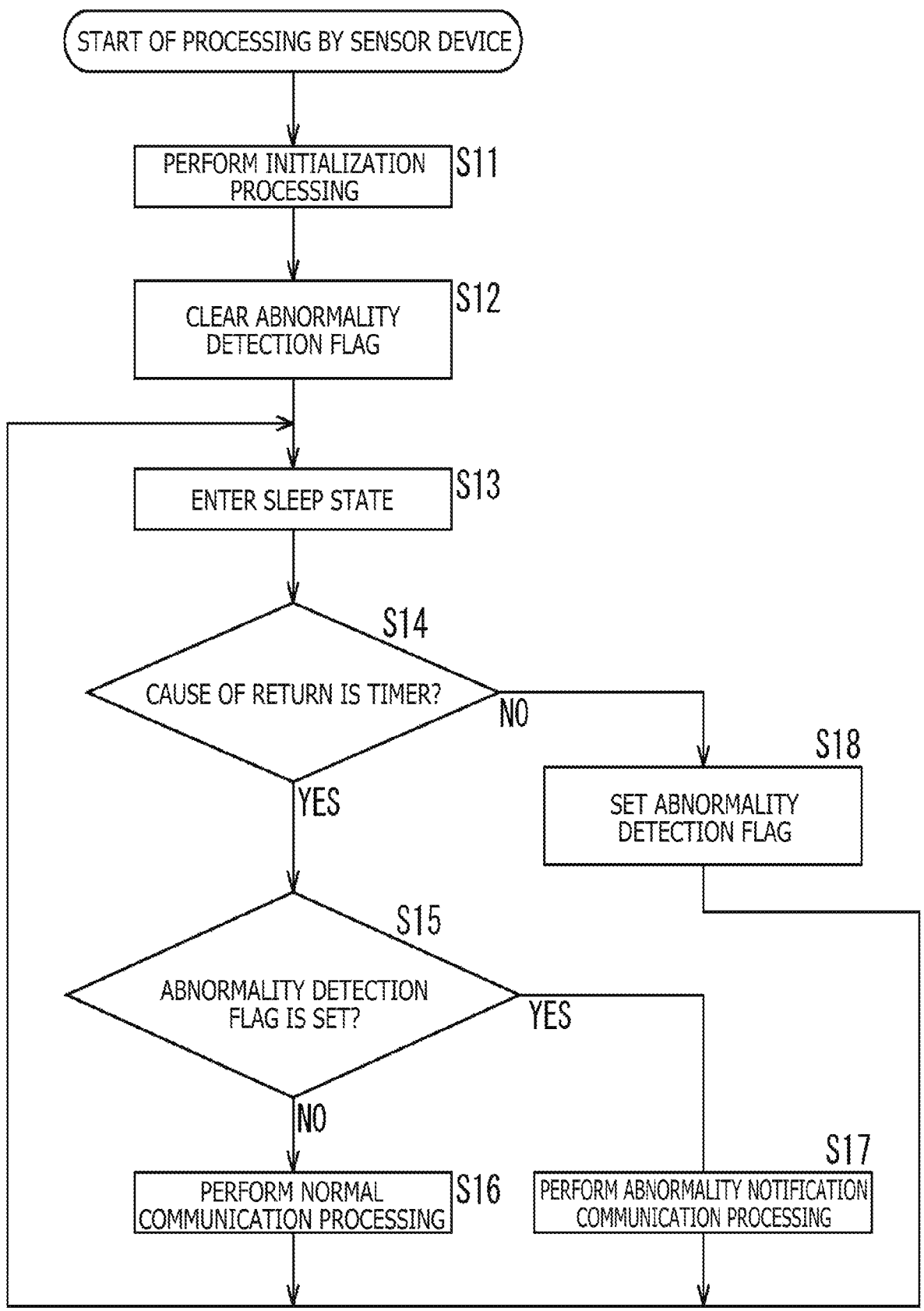
FIG. 6 is a flowchart that describes processing by the sensor device.

FIG. 6 is a flowchart that describes processing by the sensor device 11.

Subsequent to the turn on of the power supply, the power supply control unit 46 supplies power enough for the processor 42 to be capable of operating in the normal state.

In step S11, the processor 42 performs the initialization processing. As the initialization processing, the processor 42 sets the cycle of the interruption on the timer 45 so as to cause the timer 45 to periodically cause the interruption.

In step S12, the processor 42 clears the abnormality detection flag.

In step S13, the processor 42 outputs the sleep signal to the power supply control unit 46 to bring the state of the processor 42 itself into the sleep state.

In the case where the peeling detection mechanism 32 has detected the peeling of the housing from the fixing surface, the peeling detection mechanism 32 outputs the peeling detection signal to the interruption controller 44. Alternatively, the timer 45 causes the interruption to the interruption controller 44 at intervals of the cycle having been set by the processor 42.

In response to the event in which the timer 45 causes the interruption or in response to the event in which the peeling detection signal is supplied from the peeling detection mechanism 32, the interruption controller 44 outputs the interruption signal to the processor 42 and the power supply control unit 46.

In response to the event in which, in the sleep state, the interruption signal is supplied from the interruption controller 44, the processor 42 returns from the sleep state. In response to the event in which the peeling detection signal from the peeling detection mechanism 32 is supplied from the interruption controller 44, the power supply control unit 46 supplies power enough for the processor 42 to be capable of operating in the normal state.

In step S14, the processor 42 determines whether or not the cause of the return is the timer.

In the case where the result of the determination in step S14 is that the cause of the return is the timer, the processing proceeds to step S15.

In step S15, the processor 42 determines whether or not the abnormality detection flag is set.

In the case where the result of the determination in step S15 is that the abnormality detection flag is not set, the processing proceeds to step S16.

In step S16, the processor 42 performs the normal communication processing. That is, the processor 42 causes the communication processing unit 43 to transmit the sensor data. Thereafter, the processing returns to step S13, and the processes of step S13 and beyond are repeated.

In the case where the result of the determination in step S15 is that the abnormality detection flag is set, the processing proceeds to step S17.

In step S17, the processor 42 performs the abnormality notification communication processing. That is, the processor 42 causes the communication processing unit 43 to transmit the installation abnormality notification data to the communication processing unit 43. Thereafter, the processing returns to step S13, and the processes of step S13 and beyond are repeated.

On the other hand, in the case where the result of the determination in step S14 is that the cause of the return is not the timer, the processing proceeds to step S18.

In step S18, the processor 42 sets the abnormality detection signal. Thereafter, the processing returns to step S13, and the processes in step S13 and beyond are repeated.

As described above, in the case where the peeling detection signal is not detected, every time the timer 45 causes the interruption, the processes in steps from S13 to S16 are repeated. That is, the sensor device 11 is capable of performing low power operation in such a way as to repeat the operation of periodically making the measurement and transmitting the sensor data, and to, simultaneously therewith, constantly enter the sleep state after the transmission. This configuration enables achievement of a longer lifetime of the battery.

On the other hand, in the case where the peeling detection signal has been detected, the processor 42 sets the abnormality detection flag and enters the sleep state again. In the following, upon occurrence of the interruption caused by the timer 45, since the abnormality detection flag is set, the installation abnormality notification data is transmitted instead of the sensor data. In the following, every time the interruption is caused by the timer 45, the processes from S13 to S15 and the process in S17 are repeated. Through the above processing, subsequent to the change of the installation state, the sensor device 11 repeats the operation of transmitting the installation abnormality notification data.

Figure 7:
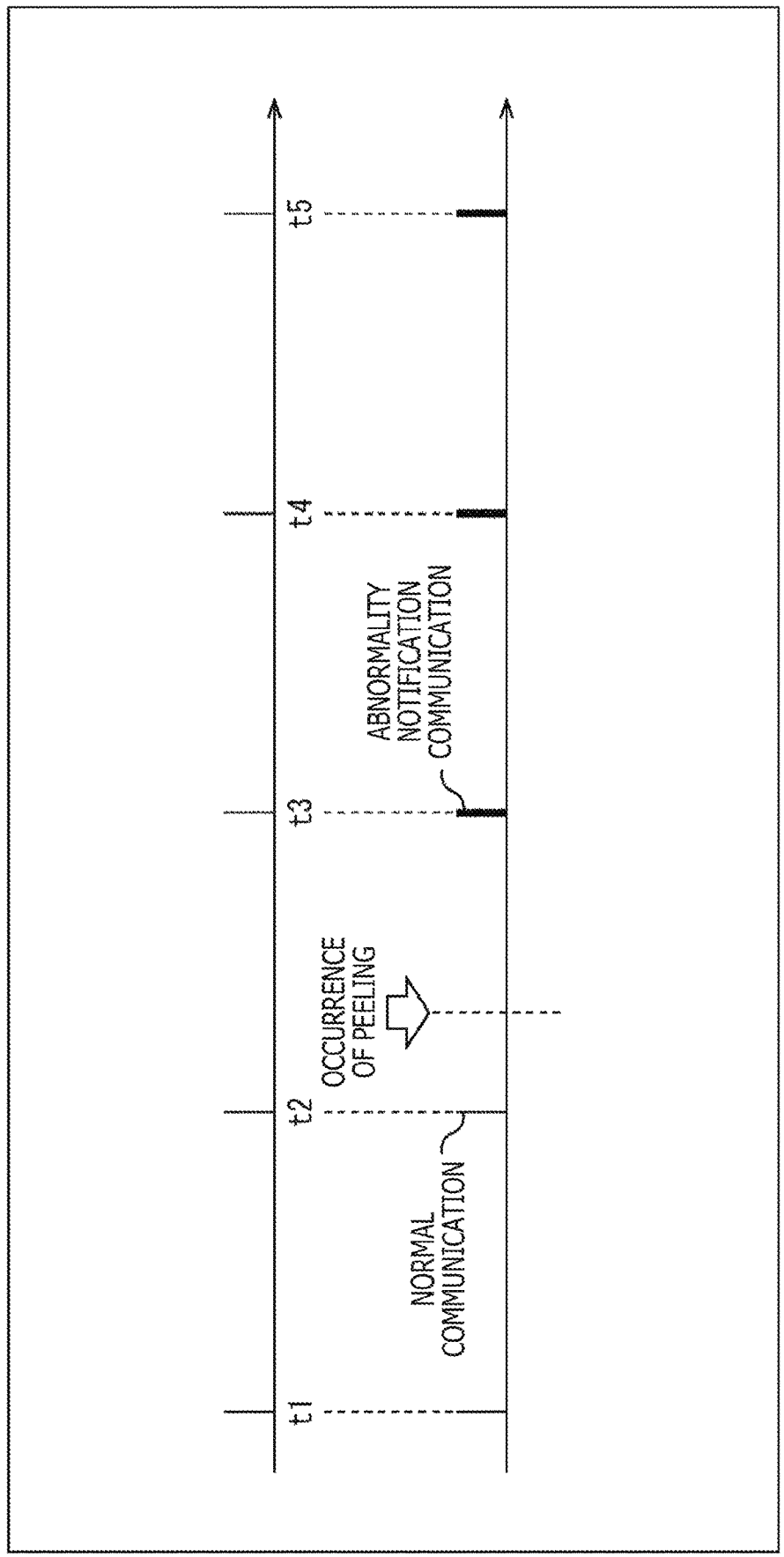
FIG. 7 is a timing chart illustrating an example of operation of the sensor device.

FIG. 7 is a timing chart illustrating an example of the operation of the sensor device 11.

As illustrated in the upper field of FIG. 7, in the case where there is no occurrence of the peeling (the occurrence of the peeling is not detected), the normal communication for the sensor data is performed at timings of times t1 to t5.

On the other hand, in the case where, as indicated by a white arrow of the lower field of FIG. 7, the occurrence of the peeling is detected after a time t2, the abnormality notification communication is performed at subsequent timings of times t3 to t5.

That is, as illustrated in the lower field of FIG. 7, after the detection of the occurrence of the peeling, the abnormality notification communication is performed at the same timings as those of the times t3 to t5 in the normal communication.

As described above, in the case where there is no occurrence of the peeling, the sensor data is transmitted, and after the detection of the peeling, the installation abnormality notification data is transmitted at the same timings as those of the communication for the sensor data.

<Operation of Home Server>

Figure 8:
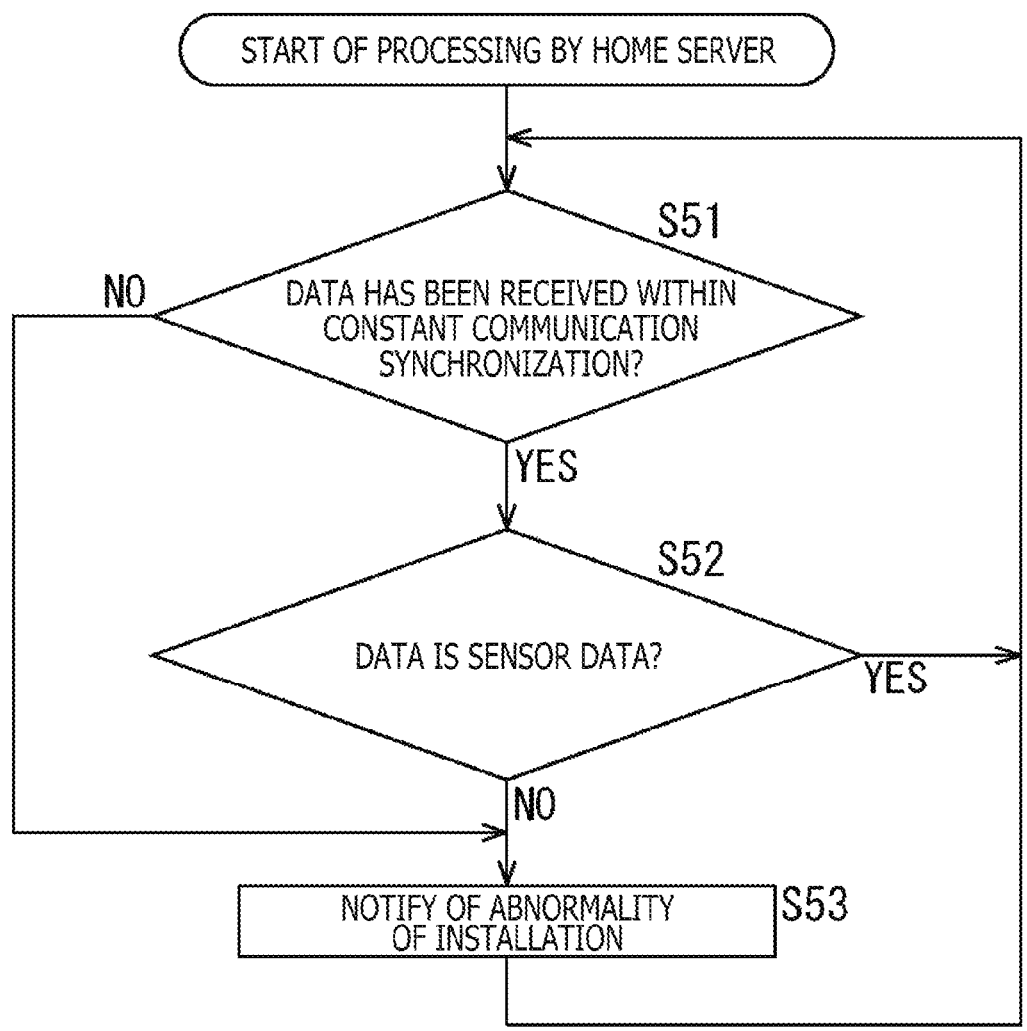
FIG. 8 is a flowchart that describes processing by the home server.

FIG. 8 is a flowchart that describes the processing by the home server 12.

As described above, the sensor data or the abnormality notification data is transmitted from the sensor device 11. The communication processing unit 71 receives the data, and supplies the received data to the processor 72.

In step S51, the processor 72 determines whether or not the data has been received within a constant communication cycle.

In the case where the result of the determination in step S51 is that the data has been received within the constant communication cycle, the processing proceeds to step S52.

In step S52, the processor 72 determines whether or not the data having been supplied from the communication processing unit 71 is the sensor data.

In the case where the result of the determination in step S52 is that the data is not the sensor data, the processing proceeds to step S53. In this case, the data in the first embodiment is the installation abnormality data, and the data in a second embodiment to be described later is power supply turned-on notification data.

Further, in the case where the result of the determination in step S51 is that the data has not been received within the constant communication cycle, the processing proceeds to step S53.

In step S53, the processor 72 causes the output unit 61 to notify of the abnormality of the installation. At this time, the processor 72 controls the output unit 61 so as to cause the output unit 61 to notify of the notification of the abnormality of the installation in an expression different from that of the notification of the result of the analysis of the sensor data.

Thereafter, the processing returns to step S51, and the processes in step S51 and beyond are repeated.

In the case where the result of the determination in step S52 is that the data is the sensor data, the processing returns to step S51, and the processes in step S51 and beyond are repeated.

As described above, in the case where the data transmitted from the sensor device 11 is the installation abnormality notification data, the abnormality of the installation is notified to a user.

As described above, in the first embodiment, the notification that the peeling has been detected is not promptly made. With this configuration, particularly according to the first embodiment, the notification that the peeling has been detected can be transmitted across a long period of time. Further, the influence of communication on any other sensor device performing the normal communication can be reduced.

2. Second Embodiment

In the above description, the sensor device 11 including the peeling detection mechanism 32 has been described. Next, as another example of the sensor device 11, a sensor device 11 including a peeling detection switch will be described. The peeling detection switch is a mechanism concurrently serving as the detection of the peeling and a switch for the power supply.

Installation Example of Sensor Device

Figure 9A:
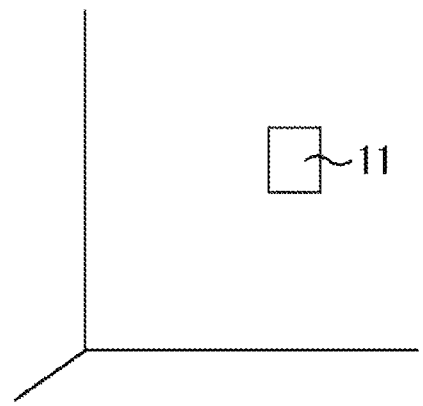
FIGS. 9A, 9B, and 9C depict diagrams illustrating another example of normal and abnormal states of the installation of a sensor device.
Figure 9B:
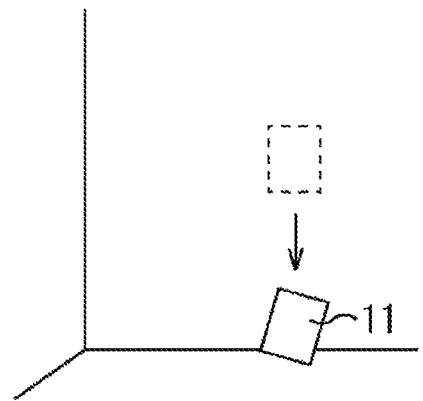
Figure 9C:
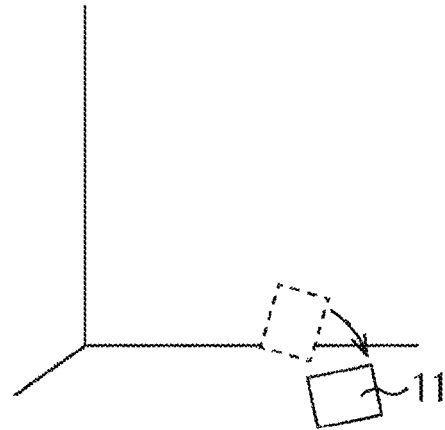

FIGS. 9A, 9B, and 9C are diagrams illustrating an example of normal and abnormal states of the installation of a sensor device 11 including the peeling detection switch.

In the normal state of the installation, as illustrated in FIG. 9A, the sensor device 11 of FIGS. 9A, 9B, and 9C is installed in a way that causes an adherend surface of its housing to adhere to a fixing surface of an in-room wall or the like by using an adhesive member such as double-sided adhesive tape. In such a normal state of the installation, the sensor device 11 transmits the sensor data described above.

In the abnormal state of the installation, as illustrated in FIG. 9B, the sensor device 11 peels from the housing. That is, in the case where the housing has peeled from the fixing surface, in the sensor device 11, the peeling detection switch is brought to a turned-off state and the power supply for the sensor device 11 is also turned off. In such an abnormal state of the installation, no data is transmitted from the sensor device 11.

Further, in another abnormal state of the installation, as illustrated in FIG. 9C after the housing has peeled from the fixing surface, the drop of the sensor device 11 onto the floor, or the like occurs, and the adherend surface is brought into close contact with a fixing surface such as the floor. At this time, the peeling detection switch is brought to a turned-on state, and the power supply for the sensor device 11 is turned on. In such another abnormal state of the installation, the sensor device 11 transmits the power supply turned-on notification data once, and then, transmits the sensor data described above.

In the abnormal state of the installation of the sensor device 11, since the sensor data is not transmitted at all, the home server 12 notifies a user of the abnormality of the installation. Further, in another abnormal state of the installation of the sensor device 11, since, after the only one transmission of the power supply turned-on notification data, the sensor data described above is transmitted, the home server 12 notifies the user of the abnormality of the installation.

Configuration Example of Sensor Device

FIG. 10 is a configuration example of the sensor device 11 of FIGS. 9A, 9B, and 9C.

Among components illustrated in FIG. 10, the same components as the components having been described with reference to FIG. 3 are denoted by the same reference signs as those of the components having been described with reference to FIG. 3. Duplicated descriptions will be omitted as appropriate.

The sensor device 11 of FIG. 10 is different from the sensor device 11 of FIG. 3 in that a peeling detection switch 111 is provided instead of the peeling detection mechanism 32 and a processor 121 is provided instead of the processor 42 of the processing unit 33.

The sensor device 11 includes the sensor 31, the peeling detection switch 111, and the processing unit 33. The processing unit 33 includes the sensor interface 41, the processor 121, the communication processing unit 43, the interruption controller 44, the timer 45, and the power supply control unit 46.

The peeling detection switch 111 is different from the peeling detection mechanism 32 of FIG. 3 and concurrently serves as a switch of the power supply for the sensor device 11. In the case where the peeling detection switch 111 is brought to a turned-off state, the power supply for the sensor device 11 is also tuned off. In the case where the peeling detection switch 111 is pushed and is brought to a turned-on state, the power supply for the sensor device 111 is also turned on.

That is, the detection of a state in which the power supply is turned off in the case where the power supply is being continuously turned on means the detection of an abnormal state, as viewed from the normal state in which the power supply is being continuously turned on. Similarly, the detection of a state in which the power supply is turned off and then is turned on again in the case where the power supply is being continuously turned on also means the detection of an abnormal state, as viewed from the normal state in which the power supply is being continuously turned on.

The processor 121, like the processor 42 of FIG. 3, performs various kinds of arithmetic processing and operation control of individual units by executing a given program, and operates as a key processing device in the sensor device 11.

The processor 121 performs the initialization processing. After the initialization processing, the processor 121 sets a power supply turned-on flag managed by the processor 121 itself. This power supply turned-on flag is a flag indicating that the power supply has been turned on. In the case where the power supply turned-on flag is set, this situation indicates that the power supply has been turned on.

Subsequent to setting the power supply turned-on flag, the processor 121 outputs the sleep signal to the power supply control unit 46 to bring the state of the processor 121 itself into the sleep state.

The processor 121 returns from the sleep state in response to an event in which, in the sleep state, the interruption signal is supplied from the interruption controller 44. After the return from the sleep state, the processor 121 confirms the state of the power supply turned-on flag.

In the case where the power supply turned-on flag is not set, the processor 121 performs the normal communication processing. Specifically, the processor 121 controls the sensor interface 141 to cause the sensor interface 141 to make a measurement of a measurement target by the sensor 31. The processor 121 converts the sensor data supplied from the sensor interface 41 in such a way that the volume of the sensor data becomes smaller. The processor 121 outputs the converted sensor data to the communication processing unit 43 to cause the communication processing unit 43 to transmit the converted sensor data to the home server 12.

After the completion of the transmission by the communication processing unit 43, the processor 121 outputs the sleep signal again to the power supply control unit 46 to enter the sleep state.

In the case where the power supply turned-on flag is set, the processor 121 clears the power supply turned-on flag, and performs power supply turned-on notification communication processing for transmitting the power supply turned-on notification data. The power supply turned-on notification data is data for notifying of an event in which the power supply has been turned on. That is, the processor 121 causes the communication processing unit 43 to transmit the power supply turned-on notification data instead of the converted sensor data.

After the power supply turned-on notification communication processing, the processor 121 performs the normal communication processing.

<Operation of Sensor Device>

Figure 11:
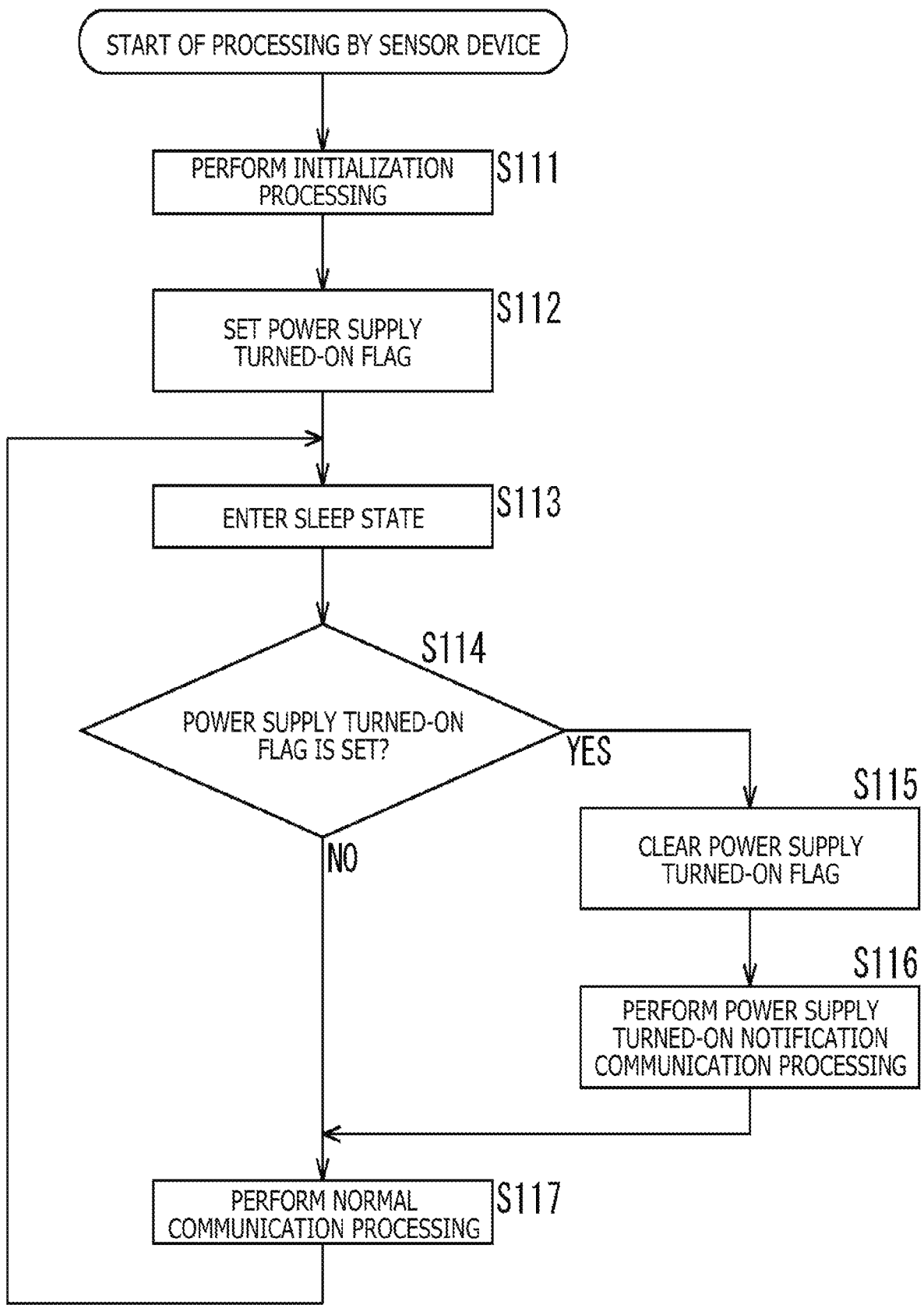
FIG. 11 is a flowchart that describes processing by the sensor device of FIG. 10.

FIG. 11 is a flowchart that describes processing by the sensor device 11 of FIG. 10.

After the turned on of the power supply, the power supply control unit 46 supplies power enough for the processor 121 to be capable of operating in the normal state.

In step S111, the processor 121 performs initialization processing. In the initialization processing, the processor 121 sets the cycle of the interruption on the timer 45 so as to cause the timer 45 to periodically cause the interruption.

In step S112, the processor 121 sets the power supply turned-on flag.

In step S113, the processor 121 outputs the sleep signal to the power supply control unit 46 to bring the state of the processor 121 itself into the sleep state.

The timer 45 causes the interruption to the interruption controller 44 at intervals of the cycle having been set by the processor 121.

In response to the event in which the timer 45 causes the interruption, the interruption controller 44 outputs the interruption signal to the processor 121 and the power supply control unit 46.

In response to the event in which the interruption signal is supplied from the interruption controller 44, the processor 121 returns from the sleep state. In response to the event in which the interruption signal is supplied from the interruption controller 44, the power supply control unit 46 supplies power enough for the processor 121 to be capable of operating in a stable state.

In step S114, the processor 121 determines whether or not the abnormality detection flag is set.

In the case where the result of the determination in step S114 is that the abnormality detection flag is set, the processing proceeds to step S115.

In step S115, the processor 121 clears the power supply turned-on flag.

In step S116, the processor 121 performs the power supply turned-on notification communication processing. That is, the processor 121 causes the communication processing unit 43 to transmit the power supply turned-on notification data. Thereafter, the processing proceeds to step S117.

On the other hand, in the case where the result of the determination in step S114 is that the abnormality detection flag is not set, the processing proceeds to step S117.

In step S117, the processor 121 performs the normal communication processing. That is, the processor 121 causes the communication processing unit 43 to transmit the sensor data. Thereafter, the processing proceeds to step S113, and the processes in step S113 and beyond are repeated.

As described above, in the case where the power supply turned-on flag is not set, every time the timer 45 causes the interruption, the processes in steps S113, S114, and S117 are repeated. That is, the sensor device 11 is capable of performing low power operation in such a way as to repeat the operation of periodically making the measurement and transmitting the sensor data, and to, simultaneously therewith, constantly enter the sleep state after the transmission. This configuration enables achievement of a longer lifetime of the battery.

Meanwhile, in the case where the installation state of the sensor 31 has changed due to the peeling of the sensor device 11 from the fixing surface, or the like, the peeling detection switch 111 is brought to the turned-off state and the power supply for the sensor device 11 is turned off, and thus, thereafter, the communication is not performed.

In this case, at the receiving side, it can be detected that an abnormality of some kind has occurred in the sensor device 11 because no communication is received notwithstanding waiting for a period of time longer than the constant communication cycle.

Further, in the case where the sensor device 11 has adhered again after its peeling, or in the case where the sensor device 11 has dropped with its adherend surface facing upward incidentally and this behavior has caused the peeling detection switch 111 to be pushed and brought to its turned-on state, the power supply turned-on notification data is transmitted through a first subsequent communication.

In this case, since the power supply turned-on notification data different from the sensor data is received, the home server 12 at the receiving side is capable of detecting that the installation state of the sensor device 11 has changed.

Note that, for the processing by the home server 12, processing basically similar to the processing having been described above with reference to FIG. 8 is performed, and thus, its description is omitted here.

Figure 12:
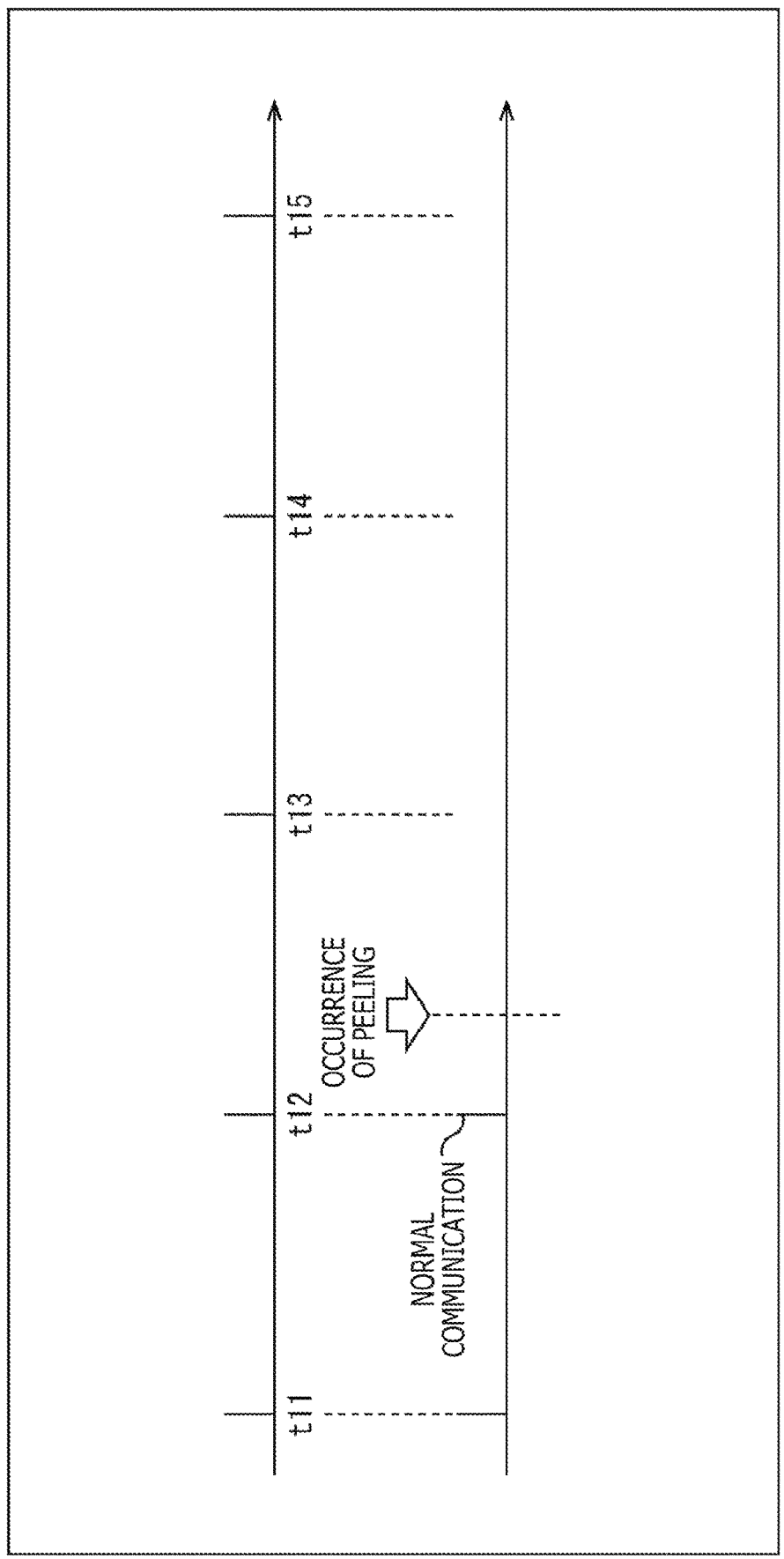
FIG. 12 is a timing chart illustrating an example of operation of the sensor device of FIG. 10.

FIG. 12 is a timing chart illustrating an example of the operation of the sensor device 11 of FIG. 10.

As illustrated in the upper field of FIG. 12, in the case where there is no occurrence of the peeling, the normal communication for the sensor data is performed at timings of times t11 to t15.

On the other hand, in the case where, as indicated by a white arrow of the lower field of FIG. 12, the occurrence of the peeling has been detected after a time t12, the power supply for the sensor device 11 is turned off and the normal communications at subsequent timings of a time t13 and times subsequent thereto are not performed.

As described above, in the case where there is no occurrence of the peeling, the sensor data is transmitted, whereas, in the case where the occurrence of the peeling has been detected, the sensor data is not transmitted thereafter, and thus, the abnormality can be detected at the receiving side.

Figure 13:
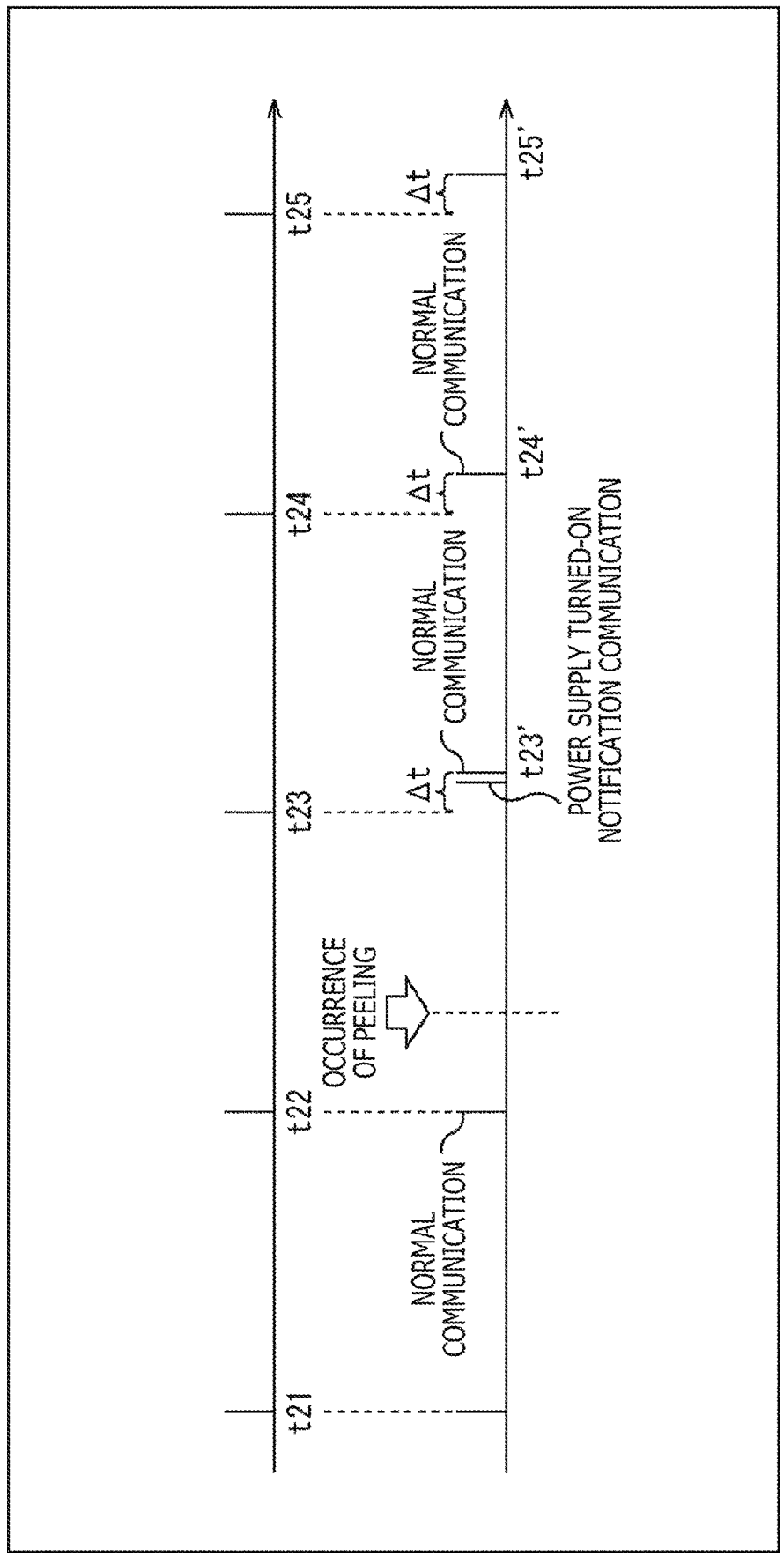
FIG. 13 is a timing chart illustrating another example of the operation of the sensor device of FIG. 10.

FIG. 13 is a timing chart illustrating another example of the operation of the sensor device 11 of FIG. 10.

As illustrated in the upper field of FIG. 13, in the case where there is no occurrence of the peeling, the normal communication for the sensor data is performed at timings of times t21 to t25.

On the other hand, in the case where, as indicated by a white arrow of the lower field of FIG. 13, the occurrence of the peeling has been detected after the time t22, and then, for some reason, the peeling detection switch 111 is pushed and the power supply is turned on, the power supply turned-on notification communication is performed.

In the case of the example of FIG. 13, the power supply turned-on notification communication is performed after a time t23, and then, the normal communication is performed at a timing of a time t23' delayed from the time t23 by a delay Δt. The normal communication is performed at a timing of a time t24' delayed from a time t24 by the delay Δt. The normal communication is performed at a timing of a time t25' delayed from a time t25 by the delay Δt.

The delay Δt is a delay that arises because of a possibility that the timing at which the peeling detection switch 111 is brought to the turned-on state again shifts from the timing at which the peeling detection switch 111 has previously been brought to the turned-on state, and the former timing may become earlier than the latter timing or may become later than the latter timing.

As described above, in the case where there is no occurrence of the peeling, the sensor data is transmitted, and in the case where the power supply has been turned on again after the turn off of the power supply subsequent to the detection of the peeling, the power supply turned-on notification is transmitted. Thus, the abnormality can be detected at the receiving side.

Note that, for the sensor in the present embodiments, a sensor having directivity, a sensor whose installation position is limited, or a sensor necessary to be in contact with a measurement target is preferably applied thereto. Examples of such a sensor are listed in FIG. 14 described below. Note, however, that the peeling detection mechanism and the peeling detection switch in the present technology are mechanisms independent from the sensor, and do not depend on what the sensor is.

FIG. 14 is a diagram listing examples of a sensor applied to the present technology and its feature.

Examples of a sensor that can be applied to the present technology include, but are not limited to, sensors listed from the top to the bottom of FIG. 14, that is, an image capture sensor, an infrared-type human detection sensor, a sunshine sensor, a temperature sensor, a humidity sensor, a rainfall sensor, a vibration sensor, an acceleration sensor, a gas sensor, and a smoke sensor.

The image capture sensor is a sensor having directivity. For the image capture sensor, its installation position and orientation are directly linked to its observation range. Note, however, that, in, not a system in which persons directly view a captured image, but a system that detects a specific object through the execution of image recognition processing and any other processing on the captured image, knowing the changes of the installation position and orientation from the recognition result is difficult.

The human detection sensor is a sensor having directivity, though not as much as the image capture sensor. For the human detection sensor, its installation position and orientation influence its observation range, and knowing the influence on the observation range from the measurement result is difficult (because the observation range cannot be visualized.)

The sunshine sensor is influenced by whether or not the sensor is facing a sunshine direction. The sunshine sensor is also influenced when its position moves and enters a shaded area.

The temperature sensor and the humidity sensor have almost no directionality. Note, however, that, for each of the temperature sensor and the humidity sensor, the measurement result is influenced in a case where its installation position changes and is exposed to direct sunlight, or in any other similar case.

In the case where the rainfall sensor is a sensor of a type that detects rainfall by using the electric conduction of raindrops, the sensor surface is required to face upward although this requirement depends on the sensing method.

In the case where the vibration sensor is a sensor for detecting the vibration of an installation target, the vibration sensor is incapable of detecting it when having disengaged from the installation target. The vibration sensor is influenced even when it is about to peel. In the case where a measurement target rarely vibrates, determining dropping off of the sensor for the reason of no detection of the vibration is difficult.

In the case where the acceleration sensor (for example, a sensor that is attached to a door to detect opening/closing of the door by using acceleration at the time of the opening/closing) is a sensor for detecting an acceleration of an installation target, the acceleration sensor is, just like the vibration sensor, incapable of detecting it when having disengaged from the installation target.

For each of the gas sensor and the smoke sensor, its installation position is determined according to the property (heavier or lighter than air) of a measurement-target gas. For example, the sensor for detecting a gas lighter than air is required to be installed near the ceiling.

<3. Others>
<Regarding Sensor>

For measurement methods for sensors, there are three kinds of categories below.

(1) No occurrence of a specific event results in a normal system (any occurrence of the specific event results in an abnormal system)

(2) No occurrence of a specific event results in an abnormal system (any occurrence of the specific event results in a normal system)

(3) Status grasping (even any occurrence of a specific event and even no occurrence of the specific event result in a normal state)

For the sensors of (2) and (3), any measurement result does not become an abnormal notification trigger, and thus, the notification is made, for example, once per one day, once per one hour, or the like.

For the sensor of (1), it is possible to make the notification only in the abnormal state. In this regard, however, since no occurrence of a specific event results in the normal state, it is indistinct that the current situation is a situation in which, merely, no abnormality is detected, or a situation in which the sensor does not correctly work and the notification cannot be made. Thus, even for the sensor of (1), it is preferable that a notification that no specific event has occurred is periodically made.

For the above reason, in the present technology, an assumption is made that the periodic notification is made regardless of the kind of measurement method. Making the abnormality notification and not making the abnormality notification are exclusive, and their respective examples have been described as the first embodiment and the second embodiment.

Further, as a background, the worldwide spread use of IoT devices such as the sensor device will lead to the lack of a radio-wave communication bandwidth therefor. Thus, the method in which individual IoT devices perform their communications at predetermined timings to thereby share the radio-wave communication bandwidth on a time division basis is preferred to a method in which the individual IoT devices perform their communications at given timings.

In the case where the communications are not performed on the time division basis, the communication timings of the individual devices may conflict with one another. In the case where the communication timing of a device has conflicted with that of another device, the increase of the magnitude of transmission power of the device to ensure its communication increases its consumed power and thereby the lifetime of its battery is shortened.

<Effects>

In the present technology, information is transmitted at predetermined time intervals, and in the case where, after the return from the sleep state, a flag indicating whether or not an abnormal state has been detected indicates that the abnormal state has not been detected, information that is to be transmitted in a normal state of the installation is transmitted. Further, in the case where the flag indicates that the abnormal state has been detected, information different from the information that is to be transmitted in the normal state is transmitted.

The present technology, therefore, makes it possible to, regardless of the kind of measurement method, notify a user of a situation in which the installation status has changed.

That is, according to the present technology, even in the case where the adhesion type of installation is employed as the method of fixing a battery-driven, compact and lightweight sensor device, it is possible to find out a situation in which the installation status has changed and an original installation purpose cannot be fulfilled any more, without incurring cost on periodic patrols and the like.

The present technology, therefore, enables a user to re-install or replace the sensor device whose installation status has changed. This configuration enables shortening of a period of time (a down time) during which the sensor device is incapable of fulfilling the original installation purpose.

Note that, in the above description, an example in which the home communication system of FIG. 1 is installed in home has been described, but its installation place is not limited to such an example. At any place where the sensor device is installed, the home communication system may be built.

The present technology can be applied regardless of the kind of a battery-driven, and compact and lightweight sensor device, that is, regardless of whether or not the sensor device is for use in sensing, and of what kind of sensor is mounted in the case where the sensor device is for use in the sensing.

Heretofore, the present technology has been described by taking the sensor device as an example, but the present technology can also be applied to devices including no sensor.

It should be noted that the effects described in the present description are just examples and are not ones that limit the effects of the present technology, and there may be other effects.

Hardware Configuration Example of Computer

The above-described series of processing can be performed by hardware, or can be performed by software. In the case where the series of processing is performed by the software, programs composing the software are installed in a computer. Here, examples of the computer include, but are not limited to, a computer embedded in dedicated hardware, and a general-purpose computer, such as a personal computer, which can perform various functions by installing various programs therein.

FIG. 15 is a block diagram illustrating a hardware configuration example of a computer that performs the above-described series of processing by using a program.

In the computer, a CPU (Central Processing Unit) 301, a ROM (Read Only Memory) 302, a RAM (Random Access Memory) 303 are coupled to one another via a bus 304.

Moreover, an input/output interface 305 is coupled to the bus 304. The input/output interface 305 is couped to an input unit 306, an output unit 307, a storage unit 308, a communication unit 309, and a drive 310.

The input unit 306 includes a keyboard, a mouse device, a microphone, and the like. The output unit 307 includes a display, a speaker, and the like. The storage unit 308 includes a hard disk, a non-volatile memory, and the like. The communication unit 309 includes a network interface and the like. The drive 310 drives a removal medium 311 such as a magnetic disk, an optical disk, a magneto-optical disk, a semiconductor memory, or the like.

In the computer configured in such a way as described above, the above-described series of processing is performed in such a way that the CPU 301 loads a program stored in, for example, the storage unit 308 into the RAM 303 via the input/output interface 305 and the bus 304, and executes the program.

The program executed by the computer (CPU 301) can be provided in the form of being recorded in the removal medium 311 serving as, for example, a package medium or the like. Further, the program can be provided via a wired or wireless transmission medium such as a local area network or the Internet.

In the computer, the program can be installed into the storage unit 308 via the input/output interface 305 by attaching the removal medium 311 to the drive 310. Further, the program can be received by the communication unit 309 via the wired or wireless transmission medium and can be installed into the storage unit 308. In addition to the above, the program can also be installed in advance in the ROM 302 or the storage unit 308.

Note that the program executed by the computer may be a program processed in time series according to the order described in the present description, or may be a program processed in parallel or at required timings such as a timing at which a call has been made.

Further, in the present description, a system means a set of a plurality of constituent elements (devices, modules (parts), and the like), and it does not matter whether or not all the constituent elements are housed in the same housing. Thus, a plurality of devices housed in different housings and connected to one another via a network, and one device whose plurality of modules is housed in one housing are both systems.

It should be noted that the effects described in the present description are just examples and are not ones that limit the effects of the present technology, and there may be other effects.

Embodiments of the present technology are not limited to the above-described embodiments, and various modifications can be made thereon within the scope not departing from the gist of the present technology.

The present technology can have, for example, a cloud computing configuration in which one function is shared and jointly processed by a plurality of devices via a network.

Further, each of the steps having been described in the above-described flowcharts not only can be performed by one device, but also can be shared and performed by a plurality of devices.

Moreover, in the case where a plurality of processes is included in one step, the plurality of processes included in the one step not only can be performed by one device, but also can be shared and performed by a plurality of devices.

Configuration Combination Examples

The present technology can also have the following configurations.

(1)

An information terminal including:

a transmitting unit that transmits information at predetermined time intervals; and a control unit that causes information that is to be transmitted in a normal state of installation to be transmitted in a case where, after a return of the control unit from a sleep state, a flag indicating whether or not an abnormal state of the installation has been detected indicates that the abnormal state has not been detected, and that causes information different from the information that is to be transmitted in the normal state to be transmitted in a case where, after the return of the control unit from the sleep state, the flag indicates that the abnormal state has been detected.

(2)

The information terminal according to (1), in which, in a case where, after the return of the control unit from the sleep state, the abnormal state has been detected, the control unit sets the flag so as to indicate that the abnormal state has been detected, and brings the control unit itself to the sleep state.

(3)

The information terminal according to (2), in which, in a case where, after the return of the control unit from the sleep state, the abnormal state has not been detected, the control unit causes either the information that is to be transmitted in the normal state or the information different from the information that is to be transmitted in the normal state, according to information indicated by the flag, and brings the control unit itself to the sleep state.

(4)

The information terminal according to (3), further including:

an abnormality detection unit that detects the abnormal state, in which the abnormality detection unit includes a switch that detects that a housing having been in contact with a fixing surface has disengaged from the fixing surface, and detects the abnormal state when the switch detects that the housing has disengaged from the fixing surface.

(5)

The information terminal according to (4), further including:

an adherent portion that causes the housing to adhere to the fixing surface, in which the adherent portion is disposed so as to enclose the switch.

(6)

The information terminal according to (1), in which, in the case where, after the return of the control unit from the sleep state, the flag indicates that the abnormal state has been detected, the control unit sets the flag so as to indicate that the abnormal state has not been detected, causes the information that is to be transmitted in the normal state to be transmitted after causing the information different from the information that is to be transmitted in the normal state to be transmitted, and brings the control unit itself to the sleep state.

(7)

The information terminal according to (6), in which, in the case where, after the return of the control unit from the sleep state, the flag indicates that the abnormal state has not been detected, the control unit causes the information that is to be transmitted in the normal state to be transmitted, and brings the control unit itself to the sleep state.

(8)

The information terminal according to (7), further including:

an abnormality detection unit that turns off a power supply when having detected the abnormal state, in which the abnormality detection unit includes a switch that enters a turned-off state when a housing having been in contact with a fixing surface has disengaged from the fixing surface, when the switch has entered the turned-off state, detects an abnormality and turns off the power supply, and when the switch has entered a turned-on state, turns on the power supply.

(9)

The information terminal according to (8), further including:

an adherent portion that causes the housing to adhere to the fixing surface, in which the adherent portion is disposed so as to enclose the switch.

(10)

The information terminal according to any one of (1) to (9), further including:

a sensor unit that makes a measurement, in which the transmitting unit transmits information generated on the basis of data obtained by the measurement, as the information that is to be transmitted in the normal state.

(11)

A program that causes a computer to function as:

a transmitting unit that transmits information at predetermined time intervals; and a control unit that causes information that is to be transmitted in a normal state of installation to be transmitted in a case where, after a return of the control unit from a sleep state, a flag indicating whether or not an abnormal state of the installation has been detected indicates that the abnormal state has not been detected, and that causes information different from the information that is to be transmitted in the normal state to be transmitted in a case where, after the return of the control unit from the sleep state, the flag indicates that the abnormal state has been detected.

(12)

An information processing device including:

a receiving unit that receives information transmitted from an information terminal including a transmitting unit that transmits the information at predetermined time intervals, and a control unit that causes information that is to be transmitted in a normal state of installation of the information terminal to be transmitted in a case where, after a return of the control unit from a sleep state, a flag indicating whether or not an abnormal state of the installation has been detected indicates that the abnormal state has not been detected, and that causes information different from the information that is to be transmitted in a case where, after the return of the control unit from the sleep state, the flag indicates that the abnormal state has been detected, the information received by the receiving unit being either the information that is to be transmitted in the normal state or the information different from the information that is to be transmitted in the normal state; and a notification control unit that causes at least the information different from the information that is to be transmitted in the normal state to be notified to a user.

(13)

A program that causes a computer to function as:

a receiving unit that receives information transmitted from an information terminal including a transmitting unit that transmits the information at predetermined time intervals, and a control unit that causes information that is to be transmitted in a normal state of installation of the information terminal to be transmitted in a case where, after a return of the control unit from a sleep state, a flag indicating whether or not an abnormal state of the installation has been detected indicates that the abnormal state has not been detected, and that causes information different from the information that is to be transmitted in the normal state to be transmitted in a case where, after the return of the control unit from the sleep state, the flag indicates that the abnormal state has been detected, the information received by the receiving unit being either the information that is to be transmitted in the normal state or the information different from the information that is to be transmitted in the normal state; and a notification control unit that causes at least the information different from the information that is to be transmitted in the normal state to be notified to a user.

REFERENCE SIGNS LIST 11, 11-1 to 11-N: Sensor device
12: Home server
13: Network
31: Sensor
32: Peeling detection mechanism
33: Processing unit
41: Sensor interface
42: Processor
43: Communication processing unit
44: Interruption controller
45: Timer
46: Power supply control unit
51: Housing
52: Adhesive member
53: Switch
61: Output unit
62: Input unit
63: Processing unit
71: Communication processing unit
72: Processor
111: Peeling detection switch
121: Processor

The invention claimed is:

1. An information terminal, comprising:
a transmitting unit configured to transmit first information and second information at specific time intervals;
a control unit configured to:
control, based on a flag that indicates that an abnormal state of installation is undetected, transmission of the first information in a normal state of installation, wherein the flag is indicated after a return of the control unit from a sleep state;
control, based on the flag that indicates that the abnormal state of installation is detected, transmission of the second information different from the first information, wherein the flag is indicated after the return of the control unit from the sleep state;
set the flag to indicate that the abnormal state of installation is undetected based on the indication of the flag that the abnormal state of installation is detected after the return of the control unit from the sleep state;
control transmission of the first information after transmission of the second information based on the set flag that indicates that the abnormal state of installation is undetected; and
control a state of the control unit to be in the sleep state based on the transmission of the first information after transmission of the second information; and
an abnormality detection unit that includes a switch which enters a turned-off state based on a housing that disengages from a fixing surface, wherein the housing is in contact with the fixing surface and the abnormality detection unit is configured to:
turn off a power supply based on detection of the abnormal state of installation and a turned-off state of the switch, and
turn on the power supply based on a turned-on state of the switch.

2. The information terminal according to claim 1, wherein based on detection of the abnormal state of installation after the return of the control unit from the sleep state, the control unit is further configured to:
set the flag to indicate that the abnormal state is detected, and
control the control unit to be in the sleep state.

3. The information terminal according to claim 2, wherein based on a determination that the abnormal state of installation is undetected after the return of the control unit from the sleep state, the control unit is further configured to:
control transmission of the first information or the second information based on information indicated by the flag; and
control the control unit to be in the sleep state.

4. The information terminal according to claim 1, further comprising:
an adherent portion that causes the housing to adhere to the fixing surface, wherein the adherent portion encloses the switch.

5. The information terminal according to claim 1, further comprising:
a sensor unit configured to measure specific data; and
the transmitting unit is further configured to transmit third information generated based on the specific as the first information.

6. A non-transitory computer-readable medium having stored thereon computer-executable instructions that, when executed by an information processing terminal including a processor, cause the processor to execute operations, the operations comprising:
transmitting, by a transmitting unit, first information and second information at specific time intervals;
controlling, by a control unit, transmission of the first information in a normal state of installation based on a flag that indicates that an abnormal state of installation is undetected, wherein the flag is indicated after a return of the control unit from a sleep state;
controlling, by the control unit, transmission of the second information different from the first information based on the flag that indicates that the abnormal state of installation is detected, wherein the flag is indicated after the return of the control unit from the sleep state;

setting, by the control unit, the flag to indicate that the abnormal state of installation is undetected based on the indication of the flag that the abnormal state of installation is detected after the return of the control unit from the sleep state;
controlling, by the control unit, transmission of the first information after transmission of the second information based on the set flag that indicates that the abnormal state of installation is undetected;
controlling, by the control unit, a state of the control unit to be in the sleep state based on the transmission of the first information after transmission of the second information;
turning off, by an abnormality detection unit, a power supply based on detection of the abnormal state of installation and a turned-off state of a switch, wherein the abnormality detection unit includes the switch which enters the turned-off state when a housing, that is in contact with a fixing surface, disengages from the fixing surface; and
turning on, by the abnormality detection unit, the power supply based on a turned-on state of the switch.

7. An information processing device, comprising:
a receiving unit configured to receive first information and second information transmitted from an information terminal including a transmitting unit that transmits the first information and the second information at specific time intervals;
a control unit configured to:
control, based on a flag that indicates that an abnormal state of installation of the information terminal is undetected, transmission of the first information in a normal state of installation of the information terminal, wherein the flag is indicated after a return of the control unit from a sleep state;
control, based on the flag that indicates that the abnormal state of installation of the information terminal is detected, transmission of the second information different from the first information, wherein the flag is indicated after the return of the control unit from the sleep state;
set the flag to indicate that the abnormal state of installation of the information terminal is undetected based on the indication of the flag that the abnormal state of installation of the information terminal is detected after the return of the control unit from the sleep state;
control reception of the first information after reception of the second information based on the set flag that indicates that the abnormal state of installation of the information terminal is undetected; and
control a state of the control unit to be in the sleep state based on the reception of the first information after the reception of the second information by the receiving unit;
an abnormality detection unit that includes a switch which enters a turned-off state based on a housing that disengages from a fixing surface, wherein the housing is in contact with the fixing surface, and the abnormality detection unit is configured to:
turn off a power supply based on detection of the abnormal state of installation and a turned-off state of the switch, and
turn on the power supply based on a turned-on state of the switch; and
a notification control unit configured to control notification of the second information different from the first information to a user.

8. A non-transitory computer-readable medium having stored thereon computer-executable instructions that, when executed by an information processing device including a processor, cause the processor to execute operations, the operations comprising:
receiving, by a receiving unit, first information and second information transmitted from an information terminal including a transmitting unit that transmits the first information and the second information at specific time intervals;
controlling, by a control unit, transmission of the first information in a normal state of installation of the information terminal based on a flag that indicates that an abnormal state of installation of the information terminal is undetected, wherein the flag is indicated after a return of the control unit from a sleep state;
controlling, by the control unit, transmission of the second information different from the first information based on the flag that indicates that the abnormal state of installation of the information terminal is detected, wherein the flag is indicated after the return of the control unit from the sleep state;
setting, by the control unit, the flag to indicate that the abnormal state of installation of the information terminal is undetected based on the indication of the flag that the abnormal state of installation of the information terminal is detected after the return of the control unit from the sleep state;
controlling, by the control unit, reception of the first information after the reception of the second information based on the set flag that indicates that the abnormal state of installation of the information terminal is undetected;
controlling, by the control unit, a state of the control unit to be in the sleep state based on the reception of the first information after reception of the second information by the receiving unit;
turning off, by an abnormality detection unit, a power supply based on detection of the abnormal state of installation of the information terminal and a turned-off state of a switch, wherein the abnormality detection unit includes the switch which enters the turned-off state when a housing, that is in contact with a fixing surface, disengages from the fixing surface;
turning on, by the abnormality detection unit, the power supply based on a turned-on state of the switch; and
controlling, by a notification control unit, notification of the second information different from the first information to a user.

* * * * *